US009495462B2

(12) United States Patent
Poznanski et al.

(10) Patent No.: US 9,495,462 B2
(45) Date of Patent: Nov. 15, 2016

(54) RE-RANKING SEARCH RESULTS

(75) Inventors: Victor Poznanski, Sammamish, WA (US); Oivind Wang, Oslo (NO); Fredrik Holm, Oslo (NO); Nicolai Bodd, Oslo (NO); Vladimir Tankovich, Bellevue, WA (US); Dmitriy Meyerzon, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 13/360,536

(22) Filed: Jan. 27, 2012

(65) Prior Publication Data
US 2013/0198174 A1 Aug. 1, 2013

(51) Int. Cl.
*G06F 17/30* (2006.01)
*G06F 7/00* (2006.01)

(52) U.S. Cl.
CPC ................. *G06F 17/30867* (2013.01)

(58) Field of Classification Search
CPC ............. G06F 17/30861; G06F 17/30867
See application file for complete search history.

(56) References Cited

U.S. PATENT DOCUMENTS

| 5,222,236 A | 6/1993 | Potash et al. ........... 707/102 |
| 5,257,577 A | 11/1993 | Clark .................... 100/99 |
| 5,321,833 A | 6/1994 | Chang et al. |
| 5,369,778 A | 11/1994 | San Soucie et al. |
| 5,544,360 A | 8/1996 | Lewak et al. |
| 5,594,660 A | 1/1997 | Sung et al. ............ 715/500.1 |
| 5,606,609 A | 2/1997 | Houser et al. ............ 713/179 |
| 5,634,124 A | 5/1997 | Khoyi et al. |
| 5,729,730 A | 3/1998 | Wlaschin et al. |
| 5,765,150 A | 6/1998 | Burrows |
| 5,826,269 A | 10/1998 | Hussey |
| 5,828,999 A | 10/1998 | Bellegarda et al. |
| 5,848,404 A | 12/1998 | Hafner et al. ............ 707/3 |

(Continued)

FOREIGN PATENT DOCUMENTS

| CA | 2279119 | 1/2001 |
| CN | 101180624 A | 5/2008 |

(Continued)

OTHER PUBLICATIONS

Korean Notice of Preliminary Rejection mailed Jan. 21, 2013 cited in 10-2008-7003121.

(Continued)

*Primary Examiner* — Jeffrey A Burke
(74) *Attorney, Agent, or Firm* — Julie Kane Akhter; Tom Wong; Micky Minhas

(57) ABSTRACT

Search results obtained from a ranking model are re-ranked based on user-configured ranking rules. For example, a user may desire to: place certain search results at a top/bottom of a ranking of search results; remove some search results; and/or adjust a ranking of some of the search results. A Graphical User Interface (GUI) allows a user to configure the ranking rules (e.g. enter key/value restrictions and to set a boost value) and to preview an application of one or more of the ranking rules. Query language operators that follow a standard operator syntax are created based on the inputs (e.g. a ranking query operator is created that may include multiple user supplied parameters). The user may also specify a portion of the results from which statistics (e.g. standard deviation, average score) are calculated. For example, a user may specify to calculate statistics for the top N number results.

19 Claims, 12 Drawing Sheets

(56) References Cited

U.S. PATENT DOCUMENTS

| | | | |
|---|---|---|---|
| 5,870,739 A | 2/1999 | Davis, III et al. | |
| 5,870,740 A | 2/1999 | Rose et al. | |
| 5,890,147 A | 3/1999 | Peltonen et al. | |
| 5,893,092 A | 4/1999 | Driscoll | 707/5 |
| 5,893,116 A | 4/1999 | Simmonds et al. | |
| 5,905,866 A | 5/1999 | Nakabayashi et al. | |
| 5,913,210 A | 6/1999 | Call | |
| 5,920,859 A | 7/1999 | Li | 707/5 |
| 5,933,822 A | 8/1999 | Braden-Harder et al. | |
| 5,933,851 A | 8/1999 | Kojima et al. | 711/133 |
| 5,943,670 A | 8/1999 | Prager | |
| 5,956,722 A | 9/1999 | Jacobson et al. | |
| 5,960,383 A | 9/1999 | Fleischer | 704/9 |
| 5,983,216 A | 11/1999 | Kirsch et al. | 707/9 |
| 5,987,457 A | 11/1999 | Ballard | 707/5 |
| 6,006,225 A | 12/1999 | Bowman et al. | 707/5 |
| 6,012,053 A * | 1/2000 | Pant et al. | |
| 6,026,398 A | 2/2000 | Brown et al. | |
| 6,029,164 A | 2/2000 | Birell et al. | |
| 6,032,196 A | 2/2000 | Monier | 709/245 |
| 6,038,610 A | 3/2000 | Belfiore et al. | |
| 6,041,323 A | 3/2000 | Kubota | 707/5 |
| 6,070,158 A | 5/2000 | Kirsch et al. | 707/3 |
| 6,070,191 A | 5/2000 | Narendran et al. | 709/226 |
| 6,098,064 A | 8/2000 | Pirolli et al. | 707/2 |
| 6,115,709 A | 9/2000 | Gilmour et al. | |
| 6,125,361 A | 9/2000 | Chakrabarti et al. | 707/3 |
| 6,128,701 A | 10/2000 | Malcolm et al. | 711/133 |
| 6,145,003 A | 11/2000 | Sanu et al. | 709/225 |
| 6,151,624 A | 11/2000 | Teare et al. | 709/217 |
| 6,167,369 A | 12/2000 | Schulze | 704/9 |
| 6,167,402 A | 12/2000 | Yeager | |
| 6,178,419 B1 | 1/2001 | Legh-Smith et al. | |
| 6,182,065 B1 | 1/2001 | Yeomans | |
| 6,182,067 B1 | 1/2001 | Presnell et al. | |
| 6,182,085 B1 | 1/2001 | Eichstaedt et al. | 707/104.1 |
| 6,182,113 B1 | 1/2001 | Narayanaswami | 709/203 |
| 6,185,558 B1 | 2/2001 | Bowman et al. | 707/5 |
| 6,199,081 B1 | 3/2001 | Meyerzon et al. | |
| 6,202,058 B1 | 3/2001 | Rose et al. | 706/45 |
| 6,208,988 B1 | 3/2001 | Schultz | 707/5 |
| 6,216,123 B1 | 4/2001 | Robertson et al. | 707/3 |
| 6,222,559 B1 | 4/2001 | Asano et al. | 345/440 |
| 6,240,407 B1 | 5/2001 | Chang et al. | 707/2 |
| 6,240,408 B1 | 5/2001 | Kaufman | 707/3 |
| 6,247,013 B1 | 6/2001 | Morimoto | 707/10 |
| 6,263,364 B1 | 7/2001 | Najork et al. | 709/217 |
| 6,269,370 B1 | 7/2001 | Kirsch | |
| 6,272,507 B1 | 8/2001 | Pirolli et al. | |
| 6,285,367 B1 | 9/2001 | Abrams et al. | 345/357 |
| 6,285,999 B1 | 9/2001 | Page | 707/5 |
| 6,304,864 B1 | 10/2001 | Liddy et al. | 706/15 |
| 6,314,421 B1 | 11/2001 | Sharnoff et al. | |
| 6,317,741 B1 | 11/2001 | Burrows | 707/5 |
| 6,324,551 B1 | 11/2001 | Lamping et al. | |
| 6,326,962 B1 | 12/2001 | Szabo | |
| 6,327,590 B1 | 12/2001 | Chidlovskii | 707/5 |
| 6,336,117 B1 | 1/2002 | Massarani et al. | |
| 6,349,308 B1 | 2/2002 | Whang et al. | 707/107 |
| 6,351,467 B1 | 2/2002 | Dillon | 370/432 |
| 6,351,755 B1 | 2/2002 | Najork et al. | 707/501.1 |
| 6,360,215 B1 | 3/2002 | Judd et al. | 707/3 |
| 6,381,597 B1 | 4/2002 | Lin | |
| 6,385,602 B1 | 5/2002 | Tso et al. | 707/3 |
| 6,389,436 B1 | 5/2002 | Chakrabarti et al. | 715/513 |
| 6,415,319 B1 | 7/2002 | Ambroziak | |
| 6,418,433 B1 | 7/2002 | Chakrabarti et al. | 707/5 |
| 6,418,452 B1 | 7/2002 | Kraft et al. | 707/200 |
| 6,418,453 B1 | 7/2002 | Kraft et al. | 707/200 |
| 6,424,966 B1 | 7/2002 | Meyerzon et al. | |
| 6,442,606 B1 | 8/2002 | Subbaroyan et al. | 709/224 |
| 6,473,752 B1 | 10/2002 | Fleming | 707/4 |
| 6,484,204 B1 | 11/2002 | Rabinovich | 709/226 |
| 6,516,312 B1 | 2/2003 | Kraft et al. | 707/3 |
| 6,526,440 B1 | 2/2003 | Bharat | |
| 6,539,376 B1 | 3/2003 | Sundaresan et al. | 707/5 |
| 6,546,388 B1 | 4/2003 | Edlund et al. | 707/5 |
| 6,547,829 B1 | 4/2003 | Meyerzon et al. | 715/501.1 |
| 6,549,896 B1 | 4/2003 | Candan et al. | 707/2 |
| 6,549,897 B1 | 4/2003 | Katariya et al. | 707/5 |
| 6,553,364 B1 | 4/2003 | Wu | |
| 6,557,036 B1 | 4/2003 | Kavacheri et al. | |
| 6,560,600 B1 | 5/2003 | Broder | |
| 6,594,682 B2 | 7/2003 | Peterson et al. | 718/102 |
| 6,598,040 B1 | 7/2003 | Cragun et al. | |
| 6,598,047 B1 | 7/2003 | Russell et al. | 707/5 |
| 6,598,051 B1 | 7/2003 | Wiener et al. | 7/100 |
| 6,601,075 B1 | 7/2003 | Huang et al. | 707/104.1 |
| 6,622,140 B1 | 9/2003 | Kantrowitz | 707/5 |
| 6,628,304 B2 | 9/2003 | Mitchell et al. | 345/734 |
| 6,631,369 B1 | 10/2003 | Meyerzon et al. | |
| 6,633,867 B1 | 10/2003 | Kraft et al. | 707/3 |
| 6,633,868 B1 | 10/2003 | Min | 707/3 |
| 6,636,853 B1 | 10/2003 | Stephens | 707/10 |
| 6,638,314 B1 | 10/2003 | Meyerzon et al. | 715/234 |
| 6,654,742 B1 | 11/2003 | Kobayashi et al. | |
| 6,671,683 B2 | 12/2003 | Kanno | 707/5 |
| 6,678,692 B1 | 1/2004 | Hyatt | 707/758 |
| 6,701,318 B2 | 3/2004 | Fox et al. | 707/10 |
| 6,718,324 B2 | 4/2004 | Edlund et al. | 707/5 |
| 6,718,365 B1 | 4/2004 | Dutta | 709/203 |
| 6,725,259 B1 * | 4/2004 | Bharat | G06F 17/30864 707/999.003 |
| 6,738,764 B2 | 5/2004 | Mao et al. | 707/5 |
| 6,763,362 B2 | 7/2004 | McKeeth | 707/104.1 |
| 6,766,316 B2 | 7/2004 | Caudill et al. | 707/3 |
| 6,766,422 B2 | 7/2004 | Beyda | 711/137 |
| 6,772,141 B1 | 8/2004 | Pratt et al. | |
| 6,775,659 B2 | 8/2004 | Clifton-Bligh | 707/1 |
| 6,775,664 B2 | 8/2004 | Lang et al. | 707/3 |
| 6,778,997 B2 | 8/2004 | Sundaresan et al. | 707/104.1 |
| 6,829,606 B2 | 12/2004 | Ripley | 707/5 |
| 6,859,800 B1 | 2/2005 | Roche et al. | 707/3 |
| 6,862,710 B1 | 3/2005 | Marchisio | 715/501.1 |
| 6,868,411 B2 | 3/2005 | Shanahan | 706/52 |
| 6,871,202 B2 | 3/2005 | Broder | 707/7 |
| 6,873,982 B1 | 3/2005 | Bates et al. | |
| 6,883,135 B1 | 4/2005 | Obata et al. | 715/202 |
| 6,886,010 B2 | 4/2005 | Kostoff | 707/3 |
| 6,886,129 B1 | 4/2005 | Raghavan et al. | 715/501.1 |
| 6,898,592 B2 | 5/2005 | Peltonen et al. | |
| 6,910,029 B1 | 6/2005 | Sundaresan | 707/2 |
| 6,931,397 B1 | 8/2005 | Sundaresan | 707/5 |
| 6,934,714 B2 | 8/2005 | Meinig | 707/102 |
| 6,944,609 B2 | 9/2005 | Witbrock | 707/3 |
| 6,947,930 B2 | 9/2005 | Anick et al. | 707/5 |
| 6,959,326 B1 | 10/2005 | Day et al. | 709/217 |
| 6,973,490 B1 | 12/2005 | Robertson et al. | 709/224 |
| 6,990,628 B1 | 1/2006 | Palmer et al. | 707/501 |
| 6,999,959 B1 | 2/2006 | Lawrence et al. | |
| 7,003,442 B1 | 2/2006 | Tsuda | |
| 7,010,532 B1 | 3/2006 | Stakutis et al. | |
| 7,016,540 B1 | 3/2006 | Gong et al. | 382/225 |
| 7,028,029 B2 | 4/2006 | Kamvar et al. | 707/5 |
| 7,039,234 B2 | 5/2006 | Geidl et al. | 382/187 |
| 7,051,023 B2 | 5/2006 | Kapur et al. | 707/5 |
| 7,065,523 B1 | 6/2006 | Peltonen et al. | |
| 7,072,888 B1 | 7/2006 | Perkins | 707/10 |
| 7,076,483 B2 | 7/2006 | Preda et al. | 707/5 |
| 7,080,073 B1 | 7/2006 | Jiang et al. | 707/7 |
| 7,085,755 B2 | 8/2006 | Bluhm et al. | |
| 7,107,218 B1 | 9/2006 | Preston | 704/270 |
| 7,133,870 B1 | 11/2006 | Tripp et al. | |
| 7,152,059 B2 | 12/2006 | Monteverde | 707/3 |
| 7,181,438 B1 | 2/2007 | Szabo | 707/2 |
| 7,197,497 B2 | 3/2007 | Cossock | 707/7 |
| 7,228,301 B2 | 6/2007 | Meyerzon | 707/3 |
| 7,231,399 B1 | 6/2007 | Bem et al. | 707/102 |
| 7,243,102 B1 * | 7/2007 | Naam et al. | |
| 7,246,128 B2 | 7/2007 | Jordahl | 707/100 |
| 7,257,574 B2 | 8/2007 | Parikh | 707/3 |
| 7,257,577 B2 | 8/2007 | Fagin et al. | 707/7 |
| 7,260,573 B1 | 8/2007 | Jeh et al. | 707/7 |
| 7,278,105 B1 | 10/2007 | Kitts | |

(56) References Cited

U.S. PATENT DOCUMENTS

| | | | |
|---|---|---|---|
| 7,281,002 B2 | 10/2007 | Farrell | 707/3 |
| 7,283,997 B1 | 10/2007 | Howard et al. | |
| 7,308,643 B1 | 12/2007 | Zhu et al. | 715/206 |
| 7,328,401 B2 | 2/2008 | Obata et al. | 707/3 |
| 7,346,604 B1 | 3/2008 | Bharat et al. | 707/3 |
| 7,346,839 B2 | 3/2008 | Acharya et al. | |
| 7,349,901 B2 | 3/2008 | Ramarathnam et al. | |
| 7,356,530 B2 | 4/2008 | Kim et al. | 707/7 |
| 7,386,527 B2 | 6/2008 | Harris et al. | 706/59 |
| 7,415,459 B2 | 8/2008 | Peltonen et al. | |
| 7,428,530 B2 | 9/2008 | Ramarathnam et al. | 707/3 |
| 7,496,561 B2 | 2/2009 | Caudill et al. | |
| 7,499,919 B2 | 3/2009 | Meyerzon et al. | |
| 7,519,529 B1 | 4/2009 | Horvitz | 704/7 |
| 7,562,068 B2* | 7/2009 | Naam | |
| 7,580,568 B1 | 8/2009 | Wang et al. | 382/173 |
| 7,584,221 B2 | 9/2009 | Robertson et al. | 707/201 |
| 7,599,917 B2 | 10/2009 | Meyerzon et al. | |
| 7,603,616 B2 | 10/2009 | Obata et al. | |
| 7,606,793 B2 | 10/2009 | Merrigan et al. | |
| 7,644,107 B2 | 1/2010 | Neagovici-Negoescu et al. | |
| 7,685,084 B2 | 3/2010 | Sisk et al. | 706/45 |
| 7,689,531 B1 | 3/2010 | Diao et al. | 706/62 |
| 7,689,559 B2 | 3/2010 | Canright et al. | |
| 7,693,829 B1 | 4/2010 | Alshawi | |
| 7,716,198 B2 | 5/2010 | Meyerzon et al. | 707/706 |
| 7,716,225 B1 | 5/2010 | Dean et al. | 707/748 |
| 7,716,226 B2 | 5/2010 | Barney | |
| 7,720,830 B2 | 5/2010 | Wen et al. | 707/705 |
| 7,739,277 B2 | 6/2010 | Meyerzon et al. | |
| 7,761,448 B2 | 7/2010 | Meyerzon et al. | |
| 7,792,833 B2 | 9/2010 | Meyerzon et al. | |
| 7,827,181 B2 | 11/2010 | Petriuc | 707/742 |
| 7,836,048 B2* | 11/2010 | Schneider | G06F 17/30864 707/725 |
| 7,836,391 B2 | 11/2010 | Tong | |
| 7,840,569 B2 | 11/2010 | Meyerzon et al. | 707/748 |
| 7,844,589 B2 | 11/2010 | Wang et al. | |
| 7,962,462 B1 | 6/2011 | Lamping et al. | |
| 8,082,246 B2 | 12/2011 | Meyerzon et al. | |
| 8,126,883 B2* | 2/2012 | Qiu | G06F 17/30675 707/723 |
| 8,165,406 B2* | 4/2012 | Tan et al. | 382/224 |
| 8,326,829 B2* | 12/2012 | Gupta | 707/725 |
| 8,370,331 B2* | 2/2013 | Pontier et al. | 707/722 |
| 8,412,702 B2* | 4/2013 | Cozzi | 707/723 |
| 8,412,717 B2* | 4/2013 | Liao et al. | 707/748 |
| 8,843,486 B2 | 9/2014 | Merrigan et al. | |
| 8,909,655 B1* | 12/2014 | McDonnell | G06F 17/30241 707/748 |
| 2001/0042076 A1 | 11/2001 | Fukuda | 707/500 |
| 2002/0016787 A1 | 2/2002 | Kanno | 707/5 |
| 2002/0026390 A1 | 2/2002 | Ulenas et al. | |
| 2002/0032772 A1 | 3/2002 | Olstad et al. | |
| 2002/0055940 A1 | 5/2002 | Elkan | 707/104.1 |
| 2002/0062323 A1 | 5/2002 | Takatori et al. | 707/514 |
| 2002/0078045 A1 | 6/2002 | Dutta | 707/7 |
| 2002/0083054 A1 | 6/2002 | Peltonen et al. | |
| 2002/0099694 A1 | 7/2002 | Diamond et al. | 707/3 |
| 2002/0103798 A1 | 8/2002 | Abrol et al. | 707/5 |
| 2002/0107861 A1 | 8/2002 | Clendinning et al. | 77/101 |
| 2002/0107886 A1 | 8/2002 | Gentner et al. | 707/511 |
| 2002/0123988 A1 | 9/2002 | Dean et al. | |
| 2002/0129014 A1 | 9/2002 | Kim et al. | 707/5 |
| 2002/0129015 A1 | 9/2002 | Caudill et al. | |
| 2002/0165873 A1 | 11/2002 | Kwok et al. | 707/500 |
| 2002/0168106 A1 | 11/2002 | Trajkovic | |
| 2002/0169595 A1 | 11/2002 | Agichtein et al. | 704/9 |
| 2002/0169754 A1 | 11/2002 | Mao et al. | |
| 2002/0169770 A1 | 11/2002 | Kim et al. | 707/5 |
| 2002/0169800 A1 | 11/2002 | Sundaresan et al. | 715/234 |
| 2003/0004952 A1 | 1/2003 | Nixon et al. | |
| 2003/0028520 A1 | 2/2003 | Alpha | |
| 2003/0037074 A1 | 2/2003 | Dwork et al. | 707/500 |
| 2003/0046389 A1 | 3/2003 | Thieme | |
| 2003/0053084 A1 | 3/2003 | Geidl et al. | 358/1.5 |
| 2003/0055810 A1 | 3/2003 | Cragun et al. | 707/1 |
| 2003/0061201 A1 | 3/2003 | Grefenstette et al. | 707/3 |
| 2003/0065706 A1 | 4/2003 | Smyth et al. | 709/200 |
| 2003/0074368 A1 | 4/2003 | Schuetze et al. | 707/103 R |
| 2003/0088545 A1 | 5/2003 | Subramaniam et al. | 707/3 |
| 2003/0101183 A1 | 5/2003 | Kabra et al. | |
| 2003/0135490 A1 | 7/2003 | Barrett et al. | 707/3 |
| 2003/0195882 A1 | 10/2003 | Lee et al. | |
| 2003/0208482 A1 | 11/2003 | Kim et al. | 707/3 |
| 2003/0217007 A1 | 11/2003 | Fukushima et al. | 705/51 |
| 2003/0217047 A1 | 11/2003 | Marchisio | 707/3 |
| 2003/0217052 A1 | 11/2003 | Rubenczyk et al. | 707/3 |
| 2004/0003028 A1 | 1/2004 | Emmett et al. | 709/203 |
| 2004/0006559 A1 | 1/2004 | Gange et al. | 707/3 |
| 2004/0024752 A1 | 2/2004 | Manber et al. | |
| 2004/0049766 A1 | 3/2004 | Bloch et al. | 717/121 |
| 2004/0064442 A1 | 4/2004 | Popovitch | |
| 2004/0093328 A1 | 5/2004 | Damle | 707/3 |
| 2004/0111408 A1 | 6/2004 | Caudill et al. | 707/3 |
| 2004/0117351 A1 | 6/2004 | Challapalli et al. | 707/2 |
| 2004/0141354 A1 | 7/2004 | Carnahan | |
| 2004/0148278 A1 | 7/2004 | Milo et al. | 707/3 |
| 2004/0181515 A1 | 9/2004 | Ullmann et al. | 707/3 |
| 2004/0186827 A1 | 9/2004 | Anick et al. | 707/3 |
| 2004/0194099 A1 | 9/2004 | Lamping et al. | 718/100 |
| 2004/0199497 A1 | 10/2004 | Timmons | 707/3 |
| 2004/0205497 A1 | 10/2004 | Alexander et al. | 715/501.1 |
| 2004/0215606 A1 | 10/2004 | Cossock | 707/3 |
| 2004/0215664 A1 | 10/2004 | Hennings et al. | 707/104.1 |
| 2004/0249795 A1 | 12/2004 | Brockway et al. | |
| 2004/0254932 A1 | 12/2004 | Gupta et al. | 707/7 |
| 2004/0260695 A1 | 12/2004 | Brill | |
| 2004/0267722 A1 | 12/2004 | Larimore et al. | |
| 2005/0033742 A1 | 2/2005 | Kamvar et al. | 707/7 |
| 2005/0044071 A1 | 2/2005 | Cho et al. | 707/3 |
| 2005/0055340 A1 | 3/2005 | Dresden | 707/3 |
| 2005/0055347 A9 | 3/2005 | Cho et al. | 707/5 |
| 2005/0060186 A1 | 3/2005 | Blowers et al. | 705/2 |
| 2005/0060304 A1 | 3/2005 | Parikh | 707/3 |
| 2005/0060310 A1 | 3/2005 | Tong et al. | 707/7 |
| 2005/0060311 A1 | 3/2005 | Tong et al. | 707/1 |
| 2005/0071328 A1 | 3/2005 | Lawrence | 707/3 |
| 2005/0071741 A1 | 3/2005 | Acharya et al. | 715/500 |
| 2005/0086192 A1 | 4/2005 | Kodama | 707/1 |
| 2005/0086206 A1 | 4/2005 | Balasubramanian et al. | 707/3 |
| 2005/0086583 A1 | 4/2005 | Obata et al. | 715/229 |
| 2005/0089215 A1 | 4/2005 | Staelin et al. | 382/157 |
| 2005/0114324 A1 | 5/2005 | Mayer | |
| 2005/0125392 A1 | 6/2005 | Curtis et al. | |
| 2005/0144162 A1 | 6/2005 | Liang | 707/3 |
| 2005/0154710 A1 | 7/2005 | Ruhlow et al. | |
| 2005/0154746 A1 | 7/2005 | Liu et al. | 707/101 |
| 2005/0165718 A1 | 7/2005 | Fontoura et al. | |
| 2005/0165753 A1 | 7/2005 | Chen et al. | |
| 2005/0165781 A1 | 7/2005 | Kraft et al. | 707/7 |
| 2005/0187965 A1 | 8/2005 | Abajian | 707/102 |
| 2005/0192936 A1 | 9/2005 | Meek et al. | 707/3 |
| 2005/0192955 A1 | 9/2005 | Farrell | 707/5 |
| 2005/0210006 A1 | 9/2005 | Robertson | 707/3 |
| 2005/0210079 A1 | 9/2005 | Edlund et al. | |
| 2005/0210105 A1 | 9/2005 | Hirata et al. | |
| 2005/0216533 A1 | 9/2005 | Berkhin | 707/204 |
| 2005/0240580 A1 | 10/2005 | Zamir et al. | 707/4 |
| 2005/0251499 A1 | 11/2005 | Huang | 707/1 |
| 2005/0256865 A1 | 11/2005 | Ma et al. | |
| 2005/0262050 A1 | 11/2005 | Fagin et al. | 707/3 |
| 2005/0283473 A1 | 12/2005 | Rousso et al. | 707/5 |
| 2005/0289133 A1 | 12/2005 | Arrouye et al. | |
| 2005/0289193 A1 | 12/2005 | Arrouye et al. | |
| 2006/0004732 A1 | 1/2006 | Odom | |
| 2006/0031183 A1 | 2/2006 | Oral et al. | |
| 2006/0036598 A1 | 2/2006 | Wu | 707/5 |
| 2006/0041521 A1 | 2/2006 | Oral et al. | |
| 2006/0047643 A1 | 3/2006 | Chaman | |
| 2006/0047649 A1 | 3/2006 | Liang | 707/4 |
| 2006/0059144 A1 | 3/2006 | Canright et al. | |
| 2006/0064411 A1 | 3/2006 | Gross et al. | |
| 2006/0069982 A1 | 3/2006 | Petriuc | 715/205 |

(56) References Cited

U.S. PATENT DOCUMENTS

| | | | |
|---|---|---|---|
| 2006/0074871 A1 | 4/2006 | Meyerzon et al. | 707/3 |
| 2006/0074883 A1 | 4/2006 | Teevan et al. | |
| 2006/0074903 A1 | 4/2006 | Meyerzon et al. | 707/5 |
| 2006/0095416 A1 | 5/2006 | Barkhin et al. | |
| 2006/0136411 A1 | 6/2006 | Meyerzon et al. | 707/5 |
| 2006/0149723 A1 | 7/2006 | Finger | |
| 2006/0161534 A1 | 7/2006 | Carson et al. | 707/3 |
| 2006/0173560 A1 | 8/2006 | Widrow | 700/48 |
| 2006/0173828 A1 | 8/2006 | Rosenberg | |
| 2006/0195440 A1 | 8/2006 | Burges et al. | 707/5 |
| 2006/0200460 A1 | 9/2006 | Meyerzon et al. | 707/5 |
| 2006/0206460 A1 | 9/2006 | Gadkari et al. | 707/3 |
| 2006/0206476 A1 | 9/2006 | Kapur et al. | 707/5 |
| 2006/0212423 A1 | 9/2006 | Jones et al. | 707/2 |
| 2006/0224554 A1 | 10/2006 | Bailey et al. | |
| 2006/0248074 A1 | 11/2006 | Carmel et al. | |
| 2006/0259481 A1 | 11/2006 | Handley | |
| 2006/0282306 A1 | 12/2006 | Thissen-Roe | 705/11 |
| 2006/0282455 A1 | 12/2006 | Lee et al. | 707/102 |
| 2006/0287993 A1 | 12/2006 | Yao et al. | 707/4 |
| 2006/0294100 A1 | 12/2006 | Meyerzon et al. | 707/7 |
| 2007/0038616 A1 | 2/2007 | Guha | 707/4 |
| 2007/0038622 A1 | 2/2007 | Meyerzon et al. | 705/5 |
| 2007/0050338 A1 | 3/2007 | Strohm et al. | |
| 2007/0067284 A1 | 3/2007 | Meyerzon et al. | |
| 2007/0073748 A1 | 3/2007 | Barney | 707/101 |
| 2007/0085716 A1 | 4/2007 | Bar-Yossef et al. | |
| 2007/0094285 A1 | 4/2007 | Agichtein et al. | |
| 2007/0106659 A1 | 5/2007 | Lu et al. | 707/7 |
| 2007/0150473 A1 | 6/2007 | Li et al. | 707/7 |
| 2007/0198459 A1 | 8/2007 | Boone et al. | 707/1 |
| 2007/0260597 A1 | 11/2007 | Cramer | 707/5 |
| 2007/0276829 A1 | 11/2007 | Wang et al. | 707/7 |
| 2008/0005068 A1 | 1/2008 | Dumais et al. | |
| 2008/0016053 A1 | 1/2008 | Frieden et al. | |
| 2008/0140641 A1 | 6/2008 | Wang | 707/5 |
| 2008/0154888 A1 | 6/2008 | Buron et al. | |
| 2008/0195596 A1 | 8/2008 | Sisk et al. | 707/5 |
| 2009/0006356 A1* | 1/2009 | Liao et al. | 707/5 |
| 2009/0006358 A1* | 1/2009 | Morris | G06F 17/30672 |
| 2009/0024606 A1 | 1/2009 | Schilit et al. | |
| 2009/0070306 A1 | 3/2009 | Stroe et al. | |
| 2009/0106221 A1 | 4/2009 | Meyerzon et al. | 707/5 |
| 2009/0106223 A1 | 4/2009 | Meyerzon et al. | 707/5 |
| 2009/0106235 A1 | 4/2009 | Tankovich et al. | 707/5 |
| 2009/0157607 A1 | 6/2009 | Tiyyagura | |
| 2009/0164929 A1 | 6/2009 | Chen et al. | |
| 2009/0240680 A1 | 9/2009 | Tankovich et al. | 707/5 |
| 2009/0259651 A1 | 10/2009 | Tankovich et al. | |
| 2009/0276421 A1 | 11/2009 | Qiu | |
| 2009/0307209 A1 | 12/2009 | Carmel et al. | |
| 2010/0191744 A1 | 7/2010 | Meyerzon et al. | |
| 2010/0268707 A1 | 10/2010 | Meyerzon et al. | |
| 2011/0106850 A1 | 5/2011 | Li et al. | |
| 2011/0137893 A1 | 6/2011 | Shnitko et al. | |
| 2011/0235909 A1 | 9/2011 | Chenthamarakshan et al. | |
| 2011/0295850 A1 | 12/2011 | Tankovich et al. | |

FOREIGN PATENT DOCUMENTS

| | | | | |
|---|---|---|---|---|
| CN | 1010000608 A | 1/2009 | | |
| CN | 101360074 A | 2/2009 | | |
| DE | 10029644 A1 | 1/2002 | | G06F 17/30 |
| EP | 0950961 A2 | 10/1999 | | G06F 17/30 |
| EP | 0950961 A3 | 10/1999 | | G06F 17/30 |
| EP | 1050830 A2 | 11/2000 | | G06F 17/30 |
| EP | 1120717 A2 | 8/2001 | | G06F 17/30 |
| EP | 1462950 | 9/2004 | | |
| EP | 1282060 A2 | 2/2005 | | G06F 17/60 |
| EP | 1557770 A1 | 7/2005 | | G06F 17/30 |
| EP | 1862916 | 12/2007 | | |
| ID | P0027547 | 2/2011 | | G06F 17/30 |
| JP | 62-297950 | 12/1987 | | |
| JP | 11-274533 | 9/1992 | | |
| JP | 04-281565 | 10/1992 | | |
| JP | 2009-204442 | 8/1997 | | |
| JP | 2009-305622 | 11/1997 | | |
| JP | 10091638 | 4/1998 | | G06F 17/30 |
| JP | 10-124524 | 5/1998 | | |
| JP | 10-240757 | 9/1998 | | |
| JP | 11-045243 | 2/1999 | | |
| JP | H11-232300 | 8/1999 | | |
| JP | 11328191 | 11/1999 | | G06F 17/30 |
| JP | 2000-194713 | 7/2000 | | |
| JP | 2001-052017 | 2/2001 | | |
| JP | 2001-117934 | 4/2001 | | |
| JP | 2001-265774 | 9/2001 | | G06F 17/30 |
| JP | 2002-24015 | 1/2002 | | |
| JP | 2002-091843 | 3/2002 | | G06F 13/00 |
| JP | 2002-132769 | 5/2002 | | G06F 17/30 |
| JP | 2002-140365 | 5/2002 | | |
| JP | 2002-157271 | 5/2002 | | |
| JP | 2002-202992 | 7/2002 | | |
| JP | 2002-245089 | 8/2002 | | |
| JP | 2002-366549 | 12/2002 | | |
| JP | 2003-67419 | 3/2003 | | G06F 17/30 |
| JP | 2003-076715 | 3/2003 | | |
| JP | 2003-208434 | 7/2003 | | |
| JP | 2003-248696 | 9/2003 | | G06F 17/30 |
| JP | 2003-0080826 | 10/2003 | | |
| JP | 2004-21589 | 1/2004 | | |
| JP | 2004-54588 | 2/2004 | | G06F 17/30 |
| JP | 2004-164555 | 6/2004 | | |
| JP | 2004-192657 | 7/2004 | | |
| JP | 2004-192657 | 8/2004 | | |
| JP | 2004-265015 | 9/2004 | | |
| JP | 2008-146424 | 12/2006 | | |
| JP | 2007-507798 | 3/2007 | | |
| JP | 2008-033931 | 2/2008 | | |
| JP | 2009-252179 | 4/2008 | | |
| JP | 2009-509275 | 3/2009 | | |
| JP | 2009-146248 | 7/2009 | | |
| JP | 4950444 | 3/2012 | | G06F 17/30 |
| KR | 10-2002-0015838 | 3/2002 | | G06F 17/30 |
| KR | 10-2003-0082109 | 10/2003 | | G06F 17/30 |
| KR | 2003-0080826 | 10/2003 | | |
| KR | 10-2006-0048716 | 5/2006 | | |
| KR | 10-2006-0116042 | 11/2006 | | G06F 17/30 |
| KR | 10-2008-0017685 | 2/2008 | | G06F 17/30 |
| KR | 10-2008-0024584 | 3/2008 | | |
| MY | 147720 | 1/2013 | | |
| RU | 2138076 C1 | 9/1999 | | G06F 17/30 |
| RU | 2001128643 | 7/2003 | | |
| RU | 2236699 | 9/2004 | | |
| RU | 2273879 | 4/2006 | | |
| RU | 2319202 C2 | 3/2008 | | |
| TW | 530224 | 5/2003 | | |
| TW | 575813 | 2/2004 | | |
| TW | I227976 | 2/2005 | | |
| TW | I284818 | 8/2007 | | |
| TW | I396984 | 5/2013 | | |
| WO | 02/42862 | 5/2002 | | |
| WO | 03/009180 A2 | 1/2003 | | |
| WO | WO 2006/121269 A1 | 11/2006 | | G06F 17/30 |
| WO | 2007/089289 | 8/2007 | | |
| WO | 2007/123416 | 11/2007 | | |
| WO | WO 2007149623 | 12/2007 | | |
| WO | 2009/072174 | 6/2009 | | |
| WO | 2010/031085 A2 | 3/2010 | | |
| ZA | 2011/00293 | 4/2012 | | |

OTHER PUBLICATIONS

Russian Official Action in 2010141559 mailed Jan. 28, 2013.

Murata, Shin Ya et al., "Ranking Search Results based on Information Needs in Conjunction with Click-Log Analysis"; Journal of Japan Database Society, Japan Database Society, Mar. 27, 2009, vol. 7, Part 4, pp. 37-42.

U.S. Appl. No. 11/874,579, Office Action mailed Sep. 10, 2013, 27 pgs.

U.S. Appl. No. 12/359,939, Amendment and Response filed Oct. 11, 2013, 11 pgs.

(56) References Cited

OTHER PUBLICATIONS

U.S. Appl. No. 12/101,951, Notice of Allowance mailed Sep. 5, 2013, 2 pgs.
U.S. Appl. No. 12/101,951, Notice of Allowance mailed Sep. 18, 2013, 2 pgs.
U.S. Appl. No. 12/101,951, Amendment filed Oct. 30, 2013, 8 pgs.
Japanese Notice of Rejection in Application 2011-527078, mailed Oct. 8, 2013, 15 pgs.
Japanese Notice of Allowance in Application 2011-194741 mailed Sep. 6, 2013, 4 pgs.
Japanese Notice of Rejection in Application 2011-266249 mailed Sep. 2, 2013, 7 pgs.
U.S. Appl. No. 11/874,844, Amendment and Response filed Mar. 15, 2010, 16 pgs.
U.S. Appl. No. 11/874,844, Notice of Allowance mailed May 18, 2010, 9 pgs.
U.S. Appl. No. 11/874,844, Notice of Allowance mailed Jun. 25, 2010, 2 pgs.
U.S. Appl. No. 12/359,939, filed Jan. 26, 2009, Amendment and Response filed May 23, 2011, 8 pgs.
U.S. Appl. No. 12/359,939, filed Jan. 26, 2009, Amendment and Response filed Jul. 21, 2011, 8 pgs.
U.S. Appl. No. 12/359,939, filed Jan. 26, 2009, Amendment and Response filed Sep. 28, 2011, 14 pgs.
U.S. Appl. No. 12/359,939, filed Jan. 26, 2009, Office Action mailed Jan. 21, 2011, 15 pgs.
U.S. Appl. No. 12/359,939, filed Jan. 26, 2009, Office Action mailed Dec. 6, 2011, 14 pgs.
U.S. Appl. No. 12/828,508, Amendment and Response filed Jan. 13, 2011, 11 pgs.
U.S. Appl. No. 12/828,508, Amendment and Response filed Sep. 6, 2011, 3 pgs.
U.S. Appl. No. 12/828,508, Notice of Allowance mailed Mar. 31, 2011, 9 pgs.
U.S. Appl. No. 12/828,508, Notice of Allowance mailed Jul. 6, 2011, 8 pgs.
U.S. Appl. No. 12/101,951, Amendment and Response filed Jun. 21, 2012, 8 pgs.
U.S. Appl. No. 12/101,951, Advisory Action mailed Jun. 27, 2012, 3 pgs.
U.S. Appl. No. 12/569,028, Office Action mailed Oct. 15, 2012, 14 pgs.
U.S. Appl. No. 12/359,939, filed Jan. 26, 2009, Amendment and Response filed Oct. 26, 2012, 11 pgs.
U.S. Appl. No. 12/359,939, filed Jan. 26, 2009, Amendment and Response filed Nov. 29, 2012, 9 pgs.
U.S. Appl. No. 12/569,028, Amendment and Response filed Jan. 15, 2013, 14 pgs.
U.S. Appl. No. 12/569,028, Office Action mailed Apr. 2, 2013, 21 pgs.
U.S. Appl. No. 12/359,939, Office Action mailed Jun. 17, 2013, 19 pgs.
U.S. Appl. No. 12/569,028, Amendment and Response filed Aug. 2, 2013, 17 pgs.
U.S. Appl. No. 12/101,951, Notice of Allowance mailed Jul. 30, 2013, 5 pgs.
U.S. Appl. No. 12/569,028, Office Action mailed Aug. 28, 2013, 21 pgs.
Australian Exam Report in Application No. 2008 00521-7, mailed Mar. 11, 2009, 4 pgs.
Australian Notice of Allowance in Application 2006279520, mailed Mar. 2, 2011, 3 pgs.
Chinese Application 200510088213.5, Notice of Allowance mailed Apr. 20, 2010, 4 pgs.
Chinese Application No. 200510088212.0, First Office Action mailed Jul. 4, 2008,10 pgs.
Chinese Application No. 200510088212.0, Notice of Allowance mailed Jan. 8, 2010, 4 pgs.
Chinese Decision on Re-Examination in Application 200510084707.6 mailed Aug. 22, 2011, 12 pgs.
Chinese Final Rejection in 200510084707.6 mailed Aug. 21, 2009, 13 pgs.
Chinese First Office Action in 200510084707.6 mailed Mar. 28, 2008, 10 pgs.
Chinese First Office Action in 200680034531.6 mailed Sep. 11, 2009, 7 pgs.
Chinese Notice of Allowance in 200510088527.5 mailed Jul. 24, 2009, 4 pgs.
Chinese Notice of Allowance in 200680034531.6 mailed Oct. 14, 2010, 6 pgs.
Chinese Notice of Allowance in Application 200510084707.6, mailed Sep. 25, 2012, 4 pgs.
Chinese Notice of Allowance in Application 200880112416.5, mailed Jul. 18, 2012,4 pgs.
Chinese Second Office Action in 200510084707.6 mailed Nov. 7, 2008, 10 pgs.
Chinese Third Office Action in 200510084707.6 mailed Feb. 20, 2009, 12 pgs.
EP 2nd Office Action in Application 05105672.9, mailed Oct. 15, 2009, 4 pgs.
EP Communication to cancel the oral summons in Application 05105048.2, mailed Jul. 16, 2012, 1 pg.
EP Examination Report in Application 05105672.9, mailed Oct. 24, 2006, 4 pgs.
EP Notice of Allowance in Application 05105048.2, mailed Aug. 13, 2012, 8 pgs.
EP Office Action in Application 05105107.6, mailed Mar. 28, 2008, 6 pgs.
EP Result of consultation in Application 05105048.2, mailed Aug. 8, 2012, 3 pgs.
EP Search Report in Application 05105107.6, mailed Apr. 7, 2006, 3 pgs.
EP Search Report in Application 05105672.9, mailed Feb. 6, 2006, 3 pgs.
European Communication in Application 05105107.6, mailed Dec. 17, 2012, 4 pgs.
European Extended Search Report in Application 097308084, mailed Oct. 2, 2012, 7 pgs.
European Notice of Allowance in Application 00309121.2, mailed Jun. 15, 2009, 5 pgs.
Extended European Search Report in Application 06804098.9, mailed Dec. 19, 2011, 7 pgs.
Malaysian Substantive Examination Report dated Jul. 31, 2012 cited in Appln No. PI 20063920.
Chinese Notice of Reexamination dated Aug. 20, 2012 cited in Appln No. 200680029645.1.
Taiwan Office Action dated Oct. 19, 2012 cited in Appln No. 95129817.
Chinese Decision on Reexamination cited in 200680029645.1, mailed Dec. 14, 2012.
U.S. Appl. No. 12/101,951, Notice of Allowance mailed Dec. 16, 2013, 3 pgs.
U.S. Appl. No. 12/101,951, Petition and Response filed Dec. 16, 2013, 5 pgs.
Russian Notice of Allowance in Application 2011108842, mailed Dec. 16, 2013, 7 pgs. (English translation).
U.S. Appl. No. 12/791,756, Amendment and Response filed Dec. 24, 2103, 19 pgs.
U.S. Appl. No. 11/874,579, filed Oct. 18, 2007, Amendment and Response filed Dec. 10, 2013, 17 pgs.
U.S. Appl. No. 12/359,939, Office Action mailed Jan. 2, 2014, 18 pgs.
Canadian Notice of Allowance in Application 2618854, dated Jan. 8, 2014, 1 pg.
Chinese Notice of Allowance in Application 2009801129286, mailed Aug. 30, 2013, 4 pgs.
"Microsoft FAST Search Server 2010 for SharePoint, Evaluation Guide", Published on: Aug. 12, 2010, Available at: http://go.microsoft.com/fwlink/p/?LinkId=189428.
Korean Notice of Preliminary Rejection mailed Feb. 4, 2013 cited in 10-2008-7007702.
Chinese Second Office Action mailed Mar. 4, 2013 cited in Appln No. 200980112928.6.

(56) References Cited

OTHER PUBLICATIONS

Canadian Office Action mailed Mar. 27, 2013 cited in Appln No. 2,618,854.
Luxenburger et al., "Matching Task profiles and User Needs in Personalized Web Search", CIKM Proceeding of the 17th ACM Conference on Information and Knowledge Mining, Oct. 2008, pp. 689-698.
PCT Search Report dated Apr. 30, 2013 cited in Appln No. PCT/US2013/022825.
Japanese Notice of Rejection mailed May 14, 2013 cited in Appln No. 2011-194741.
U.S. Appl. No. 09/493,748, filed Jan. 28, 2000 entitled "Adaptive Web Crawling Using a Statistical Model".
U.S. Appl. No. 12/101,951, filed Apr. 11, 2008 entitled "Search Results Ranking Using Editing Distance and Document Information".
Agarwal et al., "Ranking Database Queries Using User Feedback: A Neural Network Approach", Fall 2006, 9 pp.
Agichten et al., "Improving Web Search Ranking by Incorporating User Behavior Information"—http://www.mathcs.emory.edu/~eugene/papers/sigir2006ranking.pdf, 8 pp.
Bandinelli, Luca, "Using Microsoft SharePoint Products and Technologies in Multilingual Scenarios", http://www.microsoft.com/technet/prodtechnol/office/sps2003/maintain/spmultil.mspx, published on Nov. 1, 2003, printed on May 22, 2006, 32 pp.
Brin, S. et al., "The Anatomy of a Large-Scale Hypertextual Web Search Engine", Proceedings of the Seventh International World-Wide Web Conference, 'Online! Apr. 14, 1998, pp. 1-26.
Burges, Christopher J.C. et al. "Learning to Rank with Nonsmooth Cost Functions"—http://books.nips.cc/papers/txt/nips19/NIPS2006_0574.txt, 2 pp.
Carmel, D. et al., "Searching XML Documents Via XML Fragments", SIGIR Toronto, Canada, Jul.-Aug. 2003, pp. 151-158.
Chakrabarti, S., "Recent Results in Automatic Web Resource Discovery", ACM Computing Surveys, vol. 31, No. 4es, Dec. 1999, pp. 1-7.
Chen, Hsinchun et al., "A Smart Itsy Bitsy Spider for the Web", Journal of the American Society for Information Science, 49(7), 1998, pp. 604-618.
Chen, Michael et al., Cha Cha, "A System for Organizing Intranet Search Results", Computer Science Department, University of California, Berkeley, 1999, pp. 1-12.
Cho et al., "Efficient Crawling Through URL Ordering", In Proceedings of the 7th International World Wide Web Conference, Apr. 1998, pp. 161-180.
Conlon, M., "Inserts Made Simple", American Printer, Nov. 1, 2002, retrieved from internet on Dec. 17, 2010: http://americanprinter.com/press/other/printing_inserts_made_simple/, 4 pp.
Craswell, N. et al., "TREC12 Web Track as CSIRO", TREC 12, Nov. 2003, 11 pp.
Craswell et al., "Relevance Weighting for Query Independent Evidence"; Aug. 15-19, 2005, ACM, pp. 416-423.
Cutler, M. et al., "A New Study on Using HTML Structures to Improve Retrieval", 11th IEEE International Conference on Chicago, IL, Nov. 9-11, 1999, pp. 406-409.
Desmet, P. et al., "Estimation of Product Category Sales Responsiveness to Allocated Shelf Space", Intern. J. of Research in Marketing, vol. 15, No. 5, Dec. 9, 1998, pp. 443-457.
Eiron, N. et al., "Analysis of Anchor Text for Web Search", Proceedings of the 26th Annual International ACM SIGIR Conference on Research and Development in Information Retrieval, Jul. 28-Aug. 1, 2003, Toronto, Canada, 8 pgs.
Fagin, R. et al., "Searching the Workplace Web", IBM Almaden Research Center, In Proceedings of the Twelfth International World Wide Web Conference, Budapest, 2003, 21 pgs.
Fagin, Ronald, "Searching the Workplace Web", Mar. 3, 2005, pp. 1-10.
Hawking, D. et al., "Overview of the TREC-8 Web Track", TREC, Feb. 2000, pp. 1-18.

Hawking, D., "Overview of the TREC-9 Track", TREC, 2000, pp. 1-16.
Hawking., D. et al., "Overview of TREC-7 Very Large Collection Track", TREC, Jan. 1999, pp. 1-13.
Heery, Rachel, "Review of Metadata Formats", Program, vol. 30, No. 4, Oct. 1996, 1996 IEEE, pp. 345-373.
Hiemstra, D. et al., "Relevance Feedback for Best Match Term Weighting Algorithms in Information Retrieval", Proceedings of the Joint DELOS-NSF Workshop on Personalisation and Recommender Systems in Digital Libraries, ERCIM Workshop Proceedings 01/W03, pp. 37-42, Jun. 2001.
Huang et al., "Design and Implementation of a Chinese Full-Text Retrieval System Based on Probabilistic Model", IEEE, 1993, pp. 1090-1093.
Jones, K. et al., "A probabilistic model of information retrieval: development and status", Department of Information Science, City University, London, Aug. 1998, 76 pgs.
Kazama, K., "A Searching and Ranking Scheme Using Hyperlinks and Anchor Texts", IPSJ SIG Technical Report, vol. 2000, No. 71, Information Processing Society of Japan, Japan, Jul. 28, 2000, pp. 17-24.
Kleinberg, Jon M., "Authoritative Sources in a Hyperlinked Environment", Proceedings of the aCM-SIAM symposium on Discrete Algorithms, 1998, 34 pp.
Kotsakis, E., "Structured Information Retrieval in XML Documents", Proceedings of the ACM Symposium on Applied Computing, Madrid, Spain, 2002, pp. 663-667.
Kucuk, Mehmet Emin, et al., "Application of Metadata Concepts to Discovery of Internet Resources", ADVIS 2000, INCS 1909, pp. 304-313, 2000.
Kowk, K.L., "A Network Approach to Probabilistic Information Retrieval", ACM Transactions on Information Systems, vol. 13, No. 3, Jul. 1995, pp. 324-353.
Lalmas, M., "Uniform Representation of Content and Structure for Structured Document Retrieval", $20^{th}$ SGES International Conference on Knowledge Based Systems and Applied Artificial Intelligence, Cambridge, UK, Dec. 2000, pp. 1-12.
Lam et al, "Automatic document classification based on probabilistic reasoning: model and performance analysis," Oct. 12-15, 1997, IEEE, Computational Cybernetics and Simulation vol. 3, pp. 2719-2723.
Larkey, Leah S., et al., "Collection Selection and Results Merging with Topically Organized U.S. Patents and TREC Data", Proceedings of the Ninth International Conference on Information Knowledge Management, CIKM 2000, Nov. 6-11, 2000, pp. 282-289.
Lee, J.K.W. et al., "Intelligent Agents for Matching Information Providers and Consumers on the Worl-Wide Web", IEEE, 1997, pp. 189-199.
Ljosland, Mildrid, "Evaluation of Web Search Engines and the Search for Better Ranking Algorithms," http://www.aitel.hist.no/~mildrid/dring/paper/SIGIR.html, SIGIR99 Workshop on Evaluation of Reb Retrieval, Aug. 19, 1999, 5 pages.
Losee, R. et al., "Research in Information Organization", Literature Review, School of Information and Library Science, Section 4, pp. 53-96, Jan. 2001.
Losee, Robert M. et al., "Measuring Search Engine Quality and Query Difficulty: Ranking with Target and Freestyle," http://ils.unc.edu/~losee/paril.pdf, Journal of the American Society for Information Science, Jul. 29, 1999, 20 pages.
Managing External Content in Microsoft Office SharePoint Portal Server 2003, http://www.microsoft.com/technet/prodtechnol/sppt/reskit/c2261881x.mspx, published on Jun. 9, 2004, printed on May 22, 2006, 20 pp.
Manning, C. et al., "CS276A Text Information Retrieval, Mining, and Exploitation: Lecture 12", Stanford University CS276A/SYMBSYS2391/LING2391 Test Information Retrieval, Mining, and Exploitation, Fall 2002, last modified Nov. 18, 2002, 8 pgs.
Matsuo, Y., "A New Definition of Subjective Distance Between Web Pages," IPSJ Journal, vol. 44, No. 1, Information Processing Society of Japan, Japan, Jan. 15, 2003, pp. 88-94.

(56) References Cited

OTHER PUBLICATIONS

Matveeva, Irina et al., "High Accuracy Retrieval with Multiple Nested Ranker," http://people.cs.uchicago.edu/~matveeva/RankerSIGIR06.pdf, *SIGIR*'06, Seattle, WA Aug. 6-11, 2006, 8 pages.
Microsoft Full-Text Search Technologies, http://www.microsoft.com/technet/prodtechnol/sppt/sharepoint/evaluate/featfunc/mssearc . . . , published on Jun. 1, 2001, printed on May 22, 2006, 13 pp.
Microsoft SharePoint Portal Server 2001 Resource Kit: Chapter 24, Analyzing the Default Query for the Dashboard, http://www.microsoft.com/technet/prodtechnol/sppt/sharepoint/reskit/part5/c24spprk.mspx, printed on May 22, 2006, 5 pp.
Microsoft SharePoint Portal Server 2001 White Paper, "Microsoft SharePoint Portal Server: Advanced Technologies for Information Search and Retrieval," http://download.microsoft.com/download/3/7/a/37a762d7-dbe6-4b51-a6ec-f6136f44fd65/SPS_Search.doc, Jun. 2002, 12 pages.
MSDN, "Understanding Ranking," http://msdn.microsoft.com/en-us/library/ms142524.aspx, Sep. 2007, 4 pages.
Najork, Marc et al., "Breadth-First Crawling Yields High-Quality Pages", ACM, Compaq Systems Research Center, Hong Kong, 2001, pp. 114-118.
Nelson, Chris, "Use of Metadata Registries for Searching for Statistical Data", IEEE 2002, Dimension EDI Ltd., pp. 232-235, 2002.
Nie, Jien Yun, "Introduction to Information Retrieval", University of Montreal Canada, 1989 pp. 1-11.
Numerico, T., "Search engines organization of information and Web Topology", http://www.cafm.lsbu.ac.uk/eminars/sse/numerico-6-dec-2004.pdf, Dec. 6, 2004, 32 pgs.
Ogilvie, P. et al., "Combining Document Representations for Known-Item Search", Proceedings of the 26th Annual International ACM SIGIR Conference on Research and Development in Information Retrieval, Toronto, Canada, 2003, pp. 143-150.
"Okapi Similarity Measurement (Okapi")", 11th International Web Conference, www2002, 2002, p. 1.
Page, L., et al., "The PageRank Citation Ranking: Bringing Order to the Web", http://citeceer.nj.nec.com/page98pagerank.html, Jan. 1998, 18 pp.
Planning Your Information Structure Using Microsoft Office SharePoint Portal Server 2003, http://www.microsoft.com/technet/prodtechnol/sppt/reskit/c086188lx.mspx, published on Jun. 9, 2004, printed on May 22, 2006, 22 pp.
Radlinski, et al.,, "Query Chains: Learning to Rank from Implicit Feedback," http://delivery.acm.org/10.1145/1090000/1081899/p239-radlinski.pdf?key1=1081899&key2=3628533811&coll=GUIDE& CFID=27212902&CFTOKEN=53118399, *KDD*'05, Chicago, IL, Aug. 21-24, 2005,10 pages.
Robertson, S. et al., "Okapi at TREC-3", Centre for Interactive Systems Research Department of Information Science, Third Text Retrieval Conference, 1995, 19 pp.
Robertson, S. et al., "Okapi at TREC-4", 1996, 24 pp.
Robertson, S. et al., "Some Simple Effective Approximations to the 2-Poisson Model for Probabilistic Weighted Retrieval", Proceedings of the 17th Annual International ACM SIGIR Conference on Research and Development in Information Retrieval, 1994, pp. 232-241.
Schulz, Stefan, et al., "Indexing Medical WWW Documents by Morphemes", MEDINFO 2001 Proceedings of the 10th World Congress on Medical Informatics, Park I, IOS Press, Inc., pp. 266-270, 2001.
Senecal, Sylvain, "Consumers' Decision-Making Process and Their Online Shopping Behavior: A Clickstream Analysis", Jun. 1, 2004, pp. 1600-1607.
Shamsfard, Mehrnoush, et al., "ORank: An Ontology Based System for Ranking Documents," http://www.waset.org/ijcs/v1/v1-3-30.pdf, International Journal of Computer Science, vol. 1, No. 3, Apr. 10, 2006, pp. 225-231.

SharePoint Portal Server 2001 Planning and Installation Guide, http://www.microsoft.com/technet/prodtechnol/sppt/sharepoint/plan/planinst.mspx, printed on May 22, 2006, 86 pp.
Singhal, A. et al., "AT&T at TREC-9", Proceedings of the Ninth Text Retrieval Conference, NIST Special Publication 500-249, 'Online! 2001, pp. 103-105.
Singhal, A. et al., "Document Length Normalization", Cornell University, vol. 32, No. 5, 1996, pp. 619-633.
Smyth Barry,, "Relevance at a Distance—An Investigation of Distance-Biased Personalization on the Mobile Internet", no date, pp. 1-6.
Song, et al., "Exploring URL Hit Priors for Web Search", vol. 3936, Springer Berlin / Heidelberg, 2006, 2 pgs.
Sturdy, Derek, "Squirrels and nuts: metadata and knowledge management", Business Information Review, 18(4), pp. 34-42, Dec. 2001.
Taylor et al., "Optimisation Methods for Ranking Functions with Multiple Parameters"—http://delivery.acm.org/10.1145/1190000/1183698/p585-taylor.pdf?key1=1183698&key2=3677533811&coll=GUIDE&dl=GUIDE&CFID=22810237&CFTOKEN=34449120, Nov. 5-11, 2006, pp. 585-593.
Voorhees, E., "Overview of TREC 2002", Gaithersburg, Maryland, Nov. 19-22, 15 pp.
Web Page "Reuters: Reuters Corpus", http://about.reuter.com/researchandstandards/corpus/, viewed Mar. 18, 2004.
Wen, JI-Rong, "Query Clustering Using User Logs", Jan. 2002, pp. 59-81.
Westerveld, T. et al., "Retrieving Web pages using Content, Links, URLs and Anchors", Proceedings of the Tenth Text Retrieval Conference, NIST Special Publication, 'Online! Oct. 2001, pp. 1-10.
Wilkinson, R., "Effective Retrieval of Structured Documents", Annual ACM Conference on Research and Development, 1994, 7 pp.
Xue, Gui-Rong, et al., "Optimizing Web Search Using Web Click-Through Data," http://people.cs.vt.edu/~xwensi/Publication/p118-xue.pdf, *CIKM*'04, Nov. 8-13, 2004, 9 pages.
Yi, Jeonghe,e et al., "Metadata Based Web Mining for Topic-Specific Information Gathering", IEEE, pp. 359-368, 2000.
Yi, Jeonghee, et al., "Using Metadata to Enhance Web Information Gathering", D.Suciu and G. Vossen (eds.): WebDB 2000, LNCS 1997, pp. 38-57, 2001.
Yuwono, Budi and Lee, Dik L., "Search and Ranking Algorithms for Locating Resources on the World Wide Web", IEEE, 1996, pp. 164-170.
Zamir, O. et al., "Grouper: A Dynamic Clustering Interface to Web Search Results", Computer Networks (Amsterdam, Netherlands: 1999), 31(11-16): 1361-1374, 1999.
U.S. Official Action in U.S. Appl. No. 10/609,315 mailed Dec. 15, 2005.
U.S. Official Action in U.S. Appl. No. 10/981,962 mailed Apr. 5, 2006.
U.S. Official Action in U.S. Appl. No. 10/609,315 mailed Jun. 1, 2006.
U.S. Official Action in U.S. Appl. No. 10/981,962 mailed Sep. 21, 2006.
U.S. Official Action in U.S. Appl. No. 10/804,326 mailed Oct. 16, 2006.
U.S. Official Action in U.S. Appl. No. 10/955,462 mailed Nov. 3, 2006.
U.S. Official Action in U.S. Appl. No. 10/955,983 mailed Mar. 22, 2007.
U.S. Official Action in U.S. Appl. No. 10/981,962 mailed Apr. 30, 2007.
U.S. Official Action in U.S. Appl. No. 10/955,462 mailed May 11, 2007.
U.S. Official Action in U.S. Appl. No. 10/804,326 mailed Jun. 7, 2007.
U.S. Official Action in U.S. Appl. No. 11/019,091 mailed Jun. 20, 2007.
U.S. Official Action in U.S. Appl. No. 10/955,462 mailed Sep. 10, 2007.
U.S. Official Action in U.S. Appl. No. 11/073,381 mailed Sep. 18, 2007.

(56) References Cited

OTHER PUBLICATIONS

U.S. Official Action in U.S. Appl. No. 10/955,983 mailed Nov. 13, 2007.
U.S. Official Action in U.S. Appl. No. 10/804,326 mailed Dec. 11, 2007.
U.S. Official Action in U.S. Appl. No. 11/238,906 mailed Jan. 8, 2008.
U.S. Official Action in U.S. Appl. No. 10/981,962 mailed Mar. 17, 2008.
U.S. Official Action in U.S. Appl. No. 11/412,723 mailed May 28, 2008.
U.S. Official Action in U.S. Appl. No. 11/019,091 mailed Apr. 3, 2008.
U.S. Official Action in U.S. Appl. No. 11/073,381 mailed Jul. 10, 2008.
U.S. Official Action in U.S. Appl. No. 11/206,286 mailed Jul. 14, 2008.
U.S. Official Action in U.S. Appl. No. 10/955,983 mailed Jul. 21, 2008.
U.S. Official Action in U.S. Appl. No. 11/238,906 mailed Sep. 16, 2008.
U.S. Official Action in U.S. Appl. No. 10/804,326 mailed Dec. 10, 2008.
U.S. Official Action in U.S. Appl. No. 11/019,091 mailed Dec. 11, 2008.
U.S. Official Action in U.S. Appl. No. 10/955,983 mailed Dec. 18, 2008.
U.S. Official Action in U.S. Appl. No. 11/206,286 mailed Dec. 24, 2008.
U.S. Official Action in U.S. Appl. No. 11/412,723 mailed Mar. 6, 2009.
U.S. Official Action in U.S. Appl. No. 11/073,381 mailed Apr. 15, 2009.
U.S. Official Action in U.S. Appl. No. 11/238,906 mailed May 19, 2009.
U.S. Official Action in U.S. Appl. No. 10/955,983 mailed Jun. 10, 2009.
U.S. Official Action in U.S. Appl. No. 11/019,091 mailed Sep. 1, 2009.
U.S. Official Action in U.S. Appl. No. 11/412,723 mailed Sep. 3, 2009.
U.S. Official Action in U.S. Appl. No. 11/073,381 mailed Sep. 29, 2009.
U.S. Official Action in U.S. Appl. No. 11/874,844 mailed Nov. 13, 2009.
U.S. Official Action in U.S. Appl. No. 11/238,906 mailed Dec. 18, 2009.
U.S. Official Action in U.S. Appl. No. 11/412,723 mailed Mar. 11, 2010.
U.S. Official Action in U.S. Appl. No. 11/073,381 mailed Apr. 12, 2010.
U.S. Official Action in U.S. Appl. No. 11/874,579 mailed Jun. 22, 2010.
U.S. Official Action in U.S. Appl. No. 12/101,951 mailed Aug. 3, 2010.
U.S. Official Action in U.S. Appl. No. 12/828,508 mailed Aug. 13, 2010.
U.S. Official Action in U.S. Appl. No. 11/073,381 mailed Sep. 13, 2010.
U.S. Official Action in U.S. Appl. No. 11/874,579 mailed Jan. 14, 2011.
U.S. Official Action in U.S. Appl. No. 12/101,951 mailed Mar. 4, 2011.
U.S. Official Action in U.S. Appl. No. 12/207,910 mailed Jun. 7, 2011.
U.S. Official Action in U.S. Appl. No. 12/101,951 mailed Oct. 7, 2011.
U.S. Official Action in U.S. Appl. No. 12/207,910 mailed Dec. 12, 2011.
U.S. Official Action in U.S. Appl. No. 12/101,951 mailed Feb. 24, 2012.
EP Search Report in EP 00309121 mailed Jul. 18, 2002.
EP Exam Report in EP 00309121.2-1522 mailed Jul. 4, 2003.
EP Exam Report in EP 00309121.2-1527 mailed Jun. 16, 2004.
EP Search Report in EP 05105048 mailed Jan. 17, 2006.
EP Search Report in EP 05105110 dated Aug. 11, 2006.
PCT Search Report in PCT/US2006/031965 mailed Jan. 11, 2007.
EP Exam Report in EP 00309121.2-1527 mailed Feb. 8, 2007.
EP Exam Report in EP 05105048.2-2201 mailed Apr. 23, 2007.
Chinese First Official Action in 200510088527.5 mailed Apr. 18, 2008.
Chinese First Official Action in 200510088213.5 mailed May 9, 2008.
Chinese Second Official Action in 200510088213.5 mailed Oct. 10, 2008.
Chinese Second Official Action in 200510088527.5 mailed Dec. 26, 2008.
PCT Search Report in PCT/US2008/011894 mailed Feb. 27, 2009.
Chinese Final Rejection in 200510088213.5 mailed Mar. 6, 2009.
Chinese First Official Action in 200680029645.1 mailed Jun. 19, 2009.
Chinese First Official Action in 200680035828.4 mailed Jun. 19, 2009.
International Search Report mailed Aug. 28, 2009 in PCT/US2009/0036597.
Chinese Third Official Action in 200510088213.5 mailed Sep. 4, 2009.
Japanese Notice of Rejection in 2008-527094 mailed Sep. 11, 2009.
Japanese Final Rejection in 2008-527094 mailed Jan. 22, 2010.
Egyptian Official Action in PCT 269/2008 mailed Feb. 1, 2010.
Chinese Second Office Action in 200680029645.1 mailed Apr. 6, 2010.
PCT Search Report in PCT/US2009/063333 dated Apr. 22, 2010.
Russian Official Action in 2008105758 mailed Jun. 29, 2010.
European Official Action in 05105110.0-1527 mailed Aug. 4, 2010.
Chinese Decision on Rejection in 200680029645.1.mailed Aug. 12, 2010.
Japanese Notice of Rejection in 2005-175172 mailed Sep. 28, 2010.
Japanese Notice of Rejection in 2005-175173 mailed Oct. 1, 2010.
Australian First Examiner's Report in 2006279520 mailed Oct. 5, 2010.
European Search Report in 08840594.9-2201 mailed Jan. 21, 2011.
European Search Report in 08840594.9-2201 mailed Feb. 23, 2011.
Japanese Final Rejection in 2005-175172 mailed Jun. 7, 2011.
Philippines Official Action in 1-2008-500189 mailed Jun. 22, 2011.
Korean Official Action in 10-2005-0057199 mailed Aug. 4, 2011.
Chinese First Office Action in 200880112416.5 mailed Aug. 12, 2011.
European Extended Search Report in 06789800.7 mailed Oct. 13, 2011.
Japanese Appeal Decision in 2008-527094 (Appeal No. 2010-011037) mailed Nov. 4, 2011—only first page translated.
European Extended Search Report in 06836141.9-1225 mailed Dec. 27, 2011.
Korean Official Action in 10-2005-0057199 mailed Mar. 26, 2012.
EP Summons to Attend Oral Proceedings in EP 05105048.2-2201 mailed Apr. 3, 2012.
Mexican Office Action with Summary in PA/a/2008/002173 mailed Jun. 5, 2012.
Chinese First Office Action in 200980112928.6 mailed Jun. 8, 2012.
U.S. Appl. No. 10/609,315, Amendment and Response filed Nov. 29, 2006, 23 pgs.
U.S. Appl. No. 10/609,315, Amendment and Response filed Mar. 17, 2006, 14 pgs.
U.S. Appl. No. 10/609,315, Notice of Allowance mailed Jan. 24, 2007, 6 pgs.
U.S. Appl. No. 10/609,315, Notice of Allowance mailed May 30, 2007, 4 pgs.
U.S. Appl. No. 10/804,326, Advisory Action mailed Feb. 21, 2008, 3 pgs.
U.S. Appl. No. 10/804,326, Amendment and Response filed Feb. 11, 2008, 28 pgs.

(56) References Cited

OTHER PUBLICATIONS

U.S. Appl. No. 10/804,326, Amendment and Response filed Mar. 16, 2007, 21 pgs.
U.S. Appl. No. 10/804,326, Amendment and Response filed Mar. 9, 2009, 8 pgs.
U.S. Appl. No. 10/804,326, Amendment and Response filed Jun. 10, 2008, 27 pgs.
U.S. Appl. No. 10/804,326, Amendment and Response filed Sep. 7, 2007, 26 pgs.
U.S. Appl. No. 10/804,326, Notice of Allowance mailed May 29, 2009, 8 pgs.
U.S. Appl. No. 10/951,123, Advisory Action mailed Dec. 31, 2007, 3 pgs.
U.S. Appl. No. 10/951,123, Amendment and Response filed Jan. 14, 2008, 10 pgs.
U.S. Appl. No. 10/951,123, Amendment and Response filed Dec. 13, 2007, 10 pgs.
U.S. Appl. No. 10/951,123, Amendment and Response filed Apr. 25, 2007, 15 pgs.
U.S. Appl. No. 10/951,123, Amendment and Response filed Apr. 6, 2009, 18 pgs.
U.S. Appl. No. 10/951,123, Amendment and Response filed Sep. 17, 2008, 15 pgs.
U.S. Appl. No. 10/951,123, Final Office Action mailed Jan. 5, 2009, 23 pgs.
U.S. Appl. No. 10/951,123, Final Office Action mailed Jul. 13, 2007, 15 pgs.
U.S. Appl. No. 10/951,123, Notice of Allowance mailed Jun. 25, 2009, 5 pgs.
U.S. Appl. No. 10/951,123, Office Action mailed Jan. 25, 2007, 16 pgs.
U.S. Appl. No. 10/951,123, Office Action mailed Mar. 18, 2008, 20 pgs.
U.S. Appl. No. 10/955,462 Amendment and Response filed Mar. 10, 2008, 17 pgs.
U.S. Appl. No. 10/955,462 Amendment and Response filed Mar. 5, 2007, 18 pgs.
U.S. Appl. No. 10/955,462 Amendment and Response filed Aug. 8, 2007, 21 pgs.
U.S. Appl. No. 10/955,462 Notice of Allowance mailed Jan. 25, 2010, 6 pgs.
U.S. Appl. No. 10/955,462 Notice of Allowance mailed Oct. 16, 2009, 7 pgs.
U.S. Appl. No. 10/955,462 Notice of Allowance mailed Feb. 24, 2009, 7 pgs.
U.S. Appl. No. 10/955,462 Notice of Allowance mailed Jun. 10, 2009, 6 pgs.
U.S. Appl. No. 10/955,462 Notice of Allowance mailed Jun. 17, 2008, 12 pgs.
U.S. Appl. No. 10/955,462 Notice of Allowance mailed Sep. 23, 2008, 6 pgs.
U.S. Appl. No. 10/955,983, Amendment and Response filed Oct. 13, 2009, 12 pgs.
U.S. Appl. No. 10/955,983, Amendment and Response filed Mar. 18, 2009, 18 pgs.
U.S. Appl. No. 10/955,983, Amendment and Response filed May 13, 2008, 14 pgs.
U.S. Appl. No. 10/955,983, Amendment and Response filed Aug. 22, 2007, 13 pgs.
U.S. Appl. No. 10/955,983, Amendment and Response filed Sep. 25, 2008, 13 pgs.
U.S. Appl. No. 10/955,983, Notice of Allowance mailed Jan. 12, 2010, 10 pgs.
U.S. Appl. No. 10/955,983, Notice of Allowance mailed Jun. 4, 2010, 5 pgs.
U.S. Appl. No. 10/956,891, Advisory Action mailed Mar. 21, 2008, 3 pgs.
U.S. Appl. No. 10/956,891, Amendment and Response filed Oct. 16, 2008, 12 pgs.
U.S. Appl. No. 10/956,891, Amendment and Response filed Mar. 3, 2008, 11 pgs.
U.S. Appl. No. 10/956,891, Amendment and Response filed May 1, 2008, 11 pgs.
U.S. Appl. No. 10/956,891, Amendment and Response filed Jun. 1, 2009, 12 pgs.
U.S. Appl. No. 10/956,891, Amendment and Response filed Aug. 22, 2007, 11 pgs.
U.S. Appl. No. 10/956,891, Final Office Action filed Nov. 1, 2007, 18 pgs.
U.S. Appl. No. 10/956,891, Final Office Action mailed Dec. 31, 2008, 16 pgs.
U.S. Appl. No. 10/956,891, Notice of Allowance mailed Aug. 20, 2009, 7 pgs.
U.S. Appl. No. 10/956,891, Office Action mailed Mar. 22, 2007, 15 pgs.
Becker, Hila et al., "Learning Similarity Metrics for Event Identification in Social Media," Published Date: Feb. 4-6, 2010, http://infolab.stanford.edu/~mor/research/becker-wsdm10.pdf, 10 pgs.
Hoeber, Orland et al., "Evaluating the Effectiveness of Term Frequency Histograms for Supporting Interactive Web Search Tasks," Published Date: Feb. 25-27, 2008, http://delivery.acm.org/10.1145/1400000/1394484/p360-hoeber.pdf?key1=1394484&key2=1611170721&coll=GUIDE&dl=GUIDE&CFID=83362159&CFTOKEN=63982632, 9 pgs.
Pera, Maria S. et al., "Using Word Similarity to Eradicate Junk Emails," Published Date: Nov. 6-8, 2007, http://delivery.acm.org/10.1145/1330000/1321581/p943-pera.pdf?key1=1321581&key2=8421170721&coll=GUIDE&dl=GUIDE&CFID=83362328&CFTOKEN=17563913, 4 pgs.
Svore, Krysta M. et al., "Improving Web Spam Classification using Rank-time Features," Published Date: May 8, 2007, http://www2007.org/workshops/paper_101.pdf, 8 pgs.
PCT International Search Report and Written Opinion in Application PCT/US2011/033125, mailed Dec. 15, 2011, 8 pgs.
U.S. Appl. No. 12/791,756, Amendment and Response filed Apr. 30, 2012, 12 pgs.
U.S. Appl. No. 12/791,756, Amendment and Response filed Sep. 26, 2012, 14 pgs.
U.S. Appl. No. 12/791,756, Office Action mailed Jan. 31, 2012, 18 pgs.
U.S. Appl. No. 12/791,756, Office Action mailed Oct. 3, 2013, 32 pgs.
U.S. Appl. No. 12/791,756, Office Action mailed Jun. 26, 2012, 26 pgs.
Takeda et al., "Multi-document Summarization by Efficient Text Processing"; Proceedings of FIT 2007, Sixth Forum on Information Technolgy, vol. 2, No. E-014; Information Processing Sociaty of Japan, Aug. 22, 2007; pp. 165-168.
Utiyama et al., "Implementation of an IR package"; IPSJ SIG Notes, vol. 2001, No. 74 (2001-F1-63-8); Information Processiong Society of Japan, Jul. 25, 2001; pp. 57-64.
Japanese Notice of Rejection mailed May 14, 2013 cited in Appln No. 2011-504031.
Russian Decision on Grant dated Jun. 24, 2013 cited in Appln No. 2010/141559.
U.S. Appl. No. 10/956,891, Office Action mailed Jul. 16, 2008, 19 pgs.
U.S. Appl. No. 10/981,962, Advisory Action mailed Jan. 23, 2007, 3 pgs.
U.S. Appl. No. 10/981,962, Amendment and Response filed Nov. 27, 2007, 10 pgs.
U.S. Appl. No. 10/981,962, Amendment and Response filed Feb. 7, 2007, 1 pg.
U.S. Appl. No. 10/981,962, Amendment and Response filed Jun. 27, 2006, 23 pgs.
U.S. Appl. No. 10/981,962, Amendment and Response filed Jul. 27, 2007, 16 pgs.
U.S. Appl. No. 10/981,962, Amendment and Response filed Aug. 18, 2008, 10 pgs.
U.S. Appl. No. 10/981,962, Notice of Allowance mailed Jan. 29, 2009, 6 pgs.

(56) References Cited

OTHER PUBLICATIONS

U.S. Appl. No. 10/981,962, Notice of Allowance mailed Jan. 9, 2009, 6 pgs.
U.S. Appl. No. 10/981,962, Notice of Allowance mailed Oct. 15, 2008, 6 pgs.
U.S. Appl. No. 10/981,962, Notice of Allowance mailed May 8, 2009, 6 pgs.
U.S. Appl. No. 10/981,962, Notice of Allowance mailed Aug. 20, 2009, 6 pgs.
U.S. Appl. No. 10/981,962, Notice of Allowance mailed Sep. 11, 2008, 14 pgs.
U.S. Appl. No. 10/981,962, Office Action mailed Nov. 13, 2007, 3 pgs.
U.S. Appl. No. 11/019,091, Amendment and Response filed Oct. 3, 2008, 15 pgs.
U.S. Appl. No. 11/019,091, Amendment and Response filed Nov. 30, 2009, 11 pgs.
U.S. Appl. No. 11/019,091, Amendment and Response filed Dec. 20, 2007, 23 pgs.
U.S. Appl. No. 11/019,091, Amendment and Response filed Jun. 11, 2009, 12 pgs.
U.S. Appl. No. 11/019,091, Notice of Allowance mailed Dec. 23, 2009, 16 pgs.
U.S. Appl. No. 11/022,054, Amendment and Response filed Aug. 24, 2007, 19 pgs.
U.S. Appl. No. 11/022,054, Notice of Allowance mailed Nov. 15, 2007, 10 pgs.
U.S. Appl. No. 11/022,054, Office Action mailed Jun. 19, 2007, 19 pgs.
U.S. Appl. No. 11/073,381, Amendment and Response filed Dec. 13, 2010, 10 pgs.
U.S. Appl. No. 11/073,381, Amendment and Response filed Dec. 28, 2009, 9 pgs.
U.S. Appl. No. 11/073,381, Amendment and Response filed Dec. 9, 2008, 11 pgs.
U.S. Appl. No. 11/073,381, Amendment and Response filed Mar. 18, 2008, 14 pgs.
U.S. Appl. No. 11/073,381, Amendment and Response filed Jul. 15, 2009, 10 pgs.
U.S. Appl. No. 11/073,381, Amendment and Response filed Jul. 9, 2010, 10 pgs.
U.S. Appl. No. 11/206,286, Amendment and Response filed Mar. 24, 2009, 13 pgs.
U.S. Appl. No. 11/206,286, Amendment and Response filed Jul. 22, 2009, 3 pgs.
U.S. Appl. No. 11/206,286, Amendment and Response filed Sep. 30, 2008, 11 pgs.
U.S. Appl. No. 11/206,286, Notice of Allowance mailed Apr. 22, 2009, 9 pgs.
U.S. Appl. No. 11/231,955, filed Sep. 21, 2005, Amendment and Response filed Apr. 30, 2008, 12 pgs.
U.S. Appl. No. 11/231,955 filed Sep. 15, 2005, Amendment and Response filed Sep. 15, 2008, 16 pgs.
U.S. Appl. No. 11/231,955 filed Sep. 21, 2005, Final Office Action mailed Jun. 4, 2008, 8 pgs.
U.S. Appl. No. 11/231,955 filed Sep. 21, 2005, Notice of Allowance mailed Oct. 21, 2008, 5 pgs.
U.S. Appl. No. 11/231,955 filed Sep. 21, 2005, Office Action mailed Jan. 30, 2008, 8 pgs.
U.S. Appl. No. 11/238,906, Amendment and Response filed Feb. 26, 2009, 9 pgs.
U.S. Appl. No. 11/238,906, Amendment and Response filed May 28, 2010, 9 pgs.
U.S. Appl. No. 11/238,906, Amendment and Response filed Jun. 9, 2008, 10 pgs.
U.S. Appl. No. 11/238,906, Amendment and Response filed Sep. 1, 2009, 9 pgs.
U.S. Appl. No. 11/238,906, Notice of Allowance mailed Jul. 22, 2010, 10 pgs.
U.S. Appl. No. 11/238,906, Notice of Allowance mailed Aug. 5, 2010, 4 pgs.
U.S. Appl. No. 11/412,723, Amendment and Response filed Nov. 26, 2008, 10 pgs.
U.S. Appl. No. 11/412,723, Amendment and Response filed Nov. 30, 2009, 10 pgs.
U.S. Appl. No. 11/412,723, Amendment and Response filed May 31, 2010, 11 pgs.
U.S. Appl. No. 11/412,723, Amendment and Response filed Jun. 23, 2009, 11 pgs.
U.S. Appl. No. 11/412,723, Notice of Allowance mailed Jul. 9, 2010, 10 pgs.
U.S. Appl. No. 11/874,579 filed Oct. 18, 2007, Amendment and Response filed Nov. 22, 2010, 8 pgs.
U.S. Appl. No. 11/874,579 filed Oct. 18, 2007, Amendment and Response filed May 16, 2011, 14 pgs.
Indonesian Notice of Allowance in Application W00200800848 mailed Jun. 9, 2011, 4 pgs.
Japanese Final Notice of Rejection in Application No. 2005-187816 mailed Mar. 16, 2012, 5 pgs.
Japanese Final Rejection in JP Application 2008-532469, mailed Jan. 29, 2010, 19 pgs.
Japanese Interrogation in Application 2005-175174, mailed Jul. 24, 2012, 7 pgs.
Japanese Notice of Allowance in 2005-175172 mailed Mar. 6, 2012, 6 pgs.
Japanese Notice of Allowance in 2005-175173 mailed Jun. 7, 2011, 6 pgs.
Japanese Notice of Allowance in Application 2011-021985, mailed Dec. 25, 2012, 6 pgs.
Japanese Notice of Allowance in JP Application 2008-532469, mailed Feb. 22, 2011, 6 pgs.
Japanese Notice of Final Rejection in 2005-175174, mailed Aug. 5, 2011, 5 pgs.
Japanese Notice of Rejection in 2005-175174, mailed Oct. 29, 2010, 13 pgs.
Japanese Notice of Rejection in Application No. 2005-187816 mailed May 20, 2011, 13 pgs.
Japanese Office Action in JP Application 2008-532469, mailed Sep. 29, 2009, 18 pgs.
Malaysia Adverse Report in Application PI20063920, mailed Jul. 31, 2012, 3 pgs.
Malaysia Adverse Search Report in Application PI20080638, mailed Jul. 31, 2012, 4 pgs.
New Zealand Examination Report in Application No. 566532, mailed Oct. 15, 2009, 2 pgs.
PCT International Search Report, Application No. PCT/US2006/037206, mailed Jan. 16, 2007, 10 pgs.
Philippines Office Action in 1-2008-500189 mailed Mar. 11, 2011, 1 page.
Philippines Official Action in 1-2008-500433 mailed Mar. 24, 2011, 1 page.
Phillipines Letters Patent in Application 12008500189, issued Jan. 6, 2012, 2 pgs.
Russian Application No. 2008105758, Notice of Allowance mailed Dec. 16, 2010, 5 pgs.
Russian Notice of Allowance in Application No. 2008110731/08, mailed Oct. 25, 2010, 7 pgs.
Russian Official Action in 2010141559, mailed Jan. 28, 2013, 4 pgs. (in foreign language).
South Africa Notice of Allowance in Application No. 2008/02250 mailed Jul. 23, 2009, 1 page.
Korean Notice of Preliminary Rejection in Application 1020087006775, mailed Feb. 4, 2013, 1 pg.
European Report on Result of Consultation in Application EP 06836141.9, mailed Jan. 9, 2013, 3 pgs.
European Notice of Allowance in Application EP 06836141.9, mailed Jan. 31, 2013, 6 pgs.
Malaysian Notice of Allowance in Application PI20063920, mailed Dec. 14, 2012, 2 pgs.
Taiwanese Notice of Allowance in Application 95129817, mailed Jan. 29, 2013, 4 pgs.

(56) References Cited

OTHER PUBLICATIONS

Japanese Appeal Decision and Notice of Allowance in Application 2005-175174, mailed Jun. 18, 2013, 4 pgs.
Malaysian Notice of Allowance in Application PI 20080638, mailed Jun. 28, 2013, 2 pgs.
U.S. Appl. No. 12/791,756, Notice of Allowance mailed Feb. 7, 2014, 10 pgs.
U.S. Appl. No. 12/569,028, Amendment and Response filed Jan. 28, 2014, 13 pgs.
U.S. Appl. No. 12/359,939, Amendment and Response filed Mar. 11, 2014, 10 pgs.
Australian Office Action in Application 2009234120, mailed Feb. 26, 2014, 3 pgs.
Japanese Notice of Allowance in Application 2011-504031, mailed Jan. 30, 2014, 4 pgs.
U.S. Appl. No. 12/828,508, filed Jul. 1, 2010 entitled "System and Method for Ranking Search Results Using Click Distance".
Bohm et al., "Multidimensional Index Structures in Relational Databases", Journal of Intelligent Information Systems, Jul. 2000, vol. 15, Issue 1, pp. 1-20, found at: http://springerlink.com/content/n345270t27538741/fulltext.pdf.
Ding, Chen et al., "An Improved Usage-Based Ranking", obtained online Jul. 1, 2009 at: http://www.springerlink.com/content/h0jut6d1dnrk5227/fulltext.pdf, 8 pgs.
Fiedler, J. et al., Using the Web Efficiently: Mobile Crawlers, 17th Annual Int'l. Conference of the Association of Management on Computer Science, Aug. 1999, pp. 324-329.
Gross, Christian, Microsoft Interactive Developer, No. 2, "Integrating the Microsoft Index Server with Active Server Pages", Jun. 1997, 21 pgs.
Horikawa, Akira, "Table design correcting room of Access user", Visual Basic Magazine, vol. 6, No. 3, pp. 158-170, Shoeisha Col. Ltd., Japan, Mar. 1, 2000. (No English translation).
Huuhka, "Google: Data Structures and Algorithms", 13 pgs.
Mittal et al., "Framework for Synthesizing Semantic-Level Indices", Multimedia Tools and Applications, Jun. 2003, vol. 20, Iss. 2., pp. 1-24, found online at: http://www.springerlink.com/content/tv632274r1267305/fulltextpdf.
U.S. Official Action in U.S. Appl. No. 11/073,381 mailed Feb. 23, 2011, 30 pgs.
U.S. Appl. No. 12/207,910, Amendment and Response filed Mar. 12, 2012, 13 pgs.
U.S. Appl. No. 09/749,005, Amendment and Response filed Apr. 28, 2003, 12 pgs.
U.S. Appl. No. 09/749,005, Amendment and Response filed Jun. 21, 2004, 14 pgs.
U.S. Appl. No. 09/749,005, Notice of Allowance mailed Mar. 4, 2005, 4 pgs.
U.S. Appl. No. 09/749,005, Notice of Allowance mailed Apr. 7, 2005, 4 pgs.
U.S. Appl. No. 09/749,005, Notice of Allowance mailed Aug. 30, 2004, 9 pgs.
U.S. Appl. No. 09/749,005, Office Action mailed Oct. 28, 2002, 12 pgs.
U.S. Appl. No. 09/749,005, Office Action mailed Jun. 12, 2003, 10 pgs.
U.S. Appl. No. 10/959,330, Amendment and Response filed Jan. 6, 2006, 10 pgs.
U.S. Appl. No. 10/959,330, Amendment and Response filed Sep. 14, 2005, 12 pgs.
U.S. Appl. No. 10/959,330, Notice of Allowance mailed Apr. 3, 2006, 6 pgs.
U.S. Appl. No. 10/959,330, Office Action mailed Dec. 14, 2005, 6 pgs.
U.S. Appl. No. 10/959,330, Office Action mailed Jun. 27, 2005, 10 pgs.
U.S. Appl. No. 10/968,716, Amendment and Response filed Jan. 25, 2008, 8 pgs.
U.S. Appl. No. 10/968,716, Amendment and Response filed Jun. 15, 2007, 13 pgs.
U.S. Appl. No. 10/968,716, Amendment and Response filed Aug. 13, 2007, 6 pgs.
U.S. Appl. No. 10/968,716, Notice of Allowance mailed Jun. 2, 2008, 8 pgs.
U.S. Appl. No. 10/968,716, Office Action mailed Oct. 26, 2007, 14 pgs.
U.S. Appl. No. 10/968,716, Office Action mailed Mar. 15, 2007, 13 pgs.
U.S. Appl. No. 12/101,951, Amendment and Response filed Jan. 9, 2012, 10 pgs.
U.S. Appl. No. 12/101,951, Amendment and Response filed Dec. 3, 2010, 16 pgs.
U.S. Appl. No. 12/101,951, Amendment and Response filed Jun. 3, 2011, 12 pgs.
U.S. Appl. No. 12/207,910, Amendment and Response filed Sep. 7, 2011, 14 pgs.
U.S. Appl. No. 12/359,939, Amendment and Response filed Mar. 23, 2012, 11 pgs.
U.S. Appl. No. 12/359,939, Office Action mailed Jul. 17, 2012, 21 pgs.
U.S. Appl. No. 12/569,028, Amendment and Response filed Dec. 28, 2011, 8 pgs.
U.S. Appl. No. 12/569,028, Amendment and Response filed Jun. 27, 2012, 8 pgs.
U.S. Appl. No. 12/569,028, Office Action mailed Feb. 27, 2012, 11 pgs.
U.S. Appl. No. 12/569,028, Office Action mailed Sep. 28, 2011, 14 pgs.
U.S. Appl. No. 09/493,748, Advisory Action mailed Jan. 4, 2005, 2 pgs.
U.S. Appl. No. 09/493,748, Amendment and Response filed Oct. 12, 2004, 18 pgs.
U.S. Appl. No. 09/493,748, Amendment and Response filed Apr. 20, 2004, 16 pgs.
U.S. Appl. No. 09/493,748, Final Office Action mailed Jul. 20, 2004, 14 pgs.
U.S. Appl. No. 09/493,748, Office Action mailed Sep. 25, 2003, 11 pgs.
U.S. Appl. No. 09/603,695, Advisory Action mailed Aug. 27, 2004, 3 pgs.
U.S. Appl. No. 09/603,695, Amendment and Response filed Nov. 5, 2004, 9 pgs.
U.S. Appl. No. 09/603,695, Amendment and Response filed Feb. 27, 2004, 13 pgs.
U.S. Appl. No. 09/603,695, Amendment and Response filed Jul. 22, 2004, 13 pgs.
U.S. Appl. No. 09/603,695, Final Office Action mailed May 18, 2004, 12 pgs.
U.S. Appl. No. 09/603,695, Notice of Allowance mailed Dec. 21, 2004, 8 pgs.
U.S. Appl. No. 09/603,695, Office Action mailed Nov. 7, 2003, 11 pgs.
Japanese Final Notice of Reason for Rejection in Application 2011-527079, mailed May 15, 2014, 6 pgs.
U.S. Appl. No. 12/569,028, Notice of Allowance mailed Jun. 6, 2014, 5 pgs.
U.S. Appl. No. 12/207,910, Notice of Allowance mailed Jun. 20, 2014, 15 pgs.
U.S. Appl. No. 12/359,939, Amendment and Response filed Jun. 27, 2014, 11 pgs.
Australian Lapsing Notice in Application 2009290574, mailed May 19, 2014, 1 page.
Australian Notice of Allowance in Application 2009234120, mailed May 8, 2014, 2 pgs.
Israeli Office Action in Application 207830, mailed Dec. 22, 2013, 7 pgs.
Japanese Final Rejection in Application 2011-266249, mailed Apr. 7, 2014, 4 pgs.
U.S. Appl. No. 12/569,028, Notice of Allowance mailed Feb. 21, 2014, 8 pgs.
U.S. Appl. No. 11/874,579, Office Action mailed Mar. 28, 2014, 30 pgs.
U.S. Appl. No. 12/791,756, Amendment and Response after Allowance filed Apr. 4, 2014, 3 pgs.
U.S. Appl. No. 12/207,910, Notice of Allowance mailed Apr. 16, 2014, 19 pgs.
U.S. Appl. No. 12/359,939, Office Action mailed Apr. 9, 2014, 18 pgs.
U.S. Appl. No. 12/101,951, Notice of Allowance mailed Apr. 25, 2014, 4 pgs.

(56) References Cited

OTHER PUBLICATIONS

U.S. Appl. No. 12/207,910, Amendment and Response filed Jul. 14, 2014, 7 pgs.
U.S. Appl. No. 12/207,910, Amendment and Response filed Jul. 16, 2014, 7 pgs.
U.S. Appl. No. 12/359,939, Supplemental Amendment and Response filed Jun. 30, 2014, 8 pgs.
U.S. Appl. No. 12/101,951, Notice of Allowance mailed Jul. 15, 2014, 4 pgs.
U.S. Appl. No. 12/207,910, Notice of Allowance mailed Sep. 3, 2014, 18 pgs.
U.S. Appl. No. 12/359,939, Supplemental Amendment and Response filed Oct. 16, 2014, 9 pgs.
Indian Office Action in Application 1479/DEL/2005, mailed Sep. 30, 2014, 2 pgs.
Indian Office Action in Application 1569/DEL/2005, mailed Sep. 12, 2014, 2 pgs.
U.S. Appl. No. 12/359,939, Office Action mailed Nov. 6, 2014, 17 pgs.
Israeli Office Action in Application 210591, mailed Oct. 23, 2014, 6 pgs.
Taiwan Search Report in Application 98106721, mailed Aug. 28, 2014, 7 pgs.
European Communication in Application 06789800.7, mailed Oct. 23, 2014, 9 pgs.
European Intention to Grant in Application 09730808.4, mailed Nov. 7, 2014, 7 pgs.
European Summon to attend oral proceedings pursuant to Rule 115(1) EPC in Application 00309121.2, mailed Mar. 11, 2009, 11 pgs.
European Office Action in Application 05105110.0, mailed Sep. 18, 2006, 2 pgs.
Korean Notice of Preliminary Rejection in Application 10-2005-005719, Aug. 29, 2011, 1 pg.
Korean Notice of Preliminary Rejection in Application 10-2005-005719, Mar. 26, 2012, 3 pgs. (no English translation).
Indian Office Action in Application 1481/DEL/2005, mailed Sep. 30, 2014, 2 pgs.
Korean Notice of Preliminary Rejection in Application 10-2005-0057859, Feb. 11, 2010, 7 pgs. (no English translation).
Korean Notice of Preliminary Rejection in Application 10-2005-0056700, Feb. 16, 2010, 5 pgs. (no English translation).
PCT International Search Report in Application PCT/US06/37571, mailed Mar. 16, 2007, 10 pgs.
Egyptian Official Action in PCT 269/2008 mailed Mar. 17, 2010, 2 pgs.
Korean Notice of Preliminary Rejection in Application 10-2008-7003121, Jan. 24, 2013, 1 pg.
US Restriction Requirement in U.S. Appl. No. 10/804,326 mailed Aug. 20, 2008, 5 pgs.
US Restriction Requirement in U.S. Appl. No. 11/231,955 mailed Oct. 23, 2007, 6 pgs.
US Restriction Requirement in U.S. Appl. No. 11/231,955 mailed Nov. 30, 2007, 6 pgs.
Australian Office Action in Application 2009290574, mailed Dec. 3, 2014, 3 pgs.
Chinese 1st Office Action in Application 201180027027.4, mailed Dec. 29, 2014, 11 pgs.
Korean Notice of Preliminary Rejection in Application 10-2010-7022177, mailed Dec. 23, 2014, 9 pgs.
Australian Notice of Allowance in Application 2009290574, mailed Jan. 16, 2015, 2 pgs.
Taiwanese Notice of Allowance in Application 98106721, mailed Jan. 30, 2015, 4 pgs.
U.S. Appl. No. 12/359,939, Amendment and Response filed Feb. 12, 2015, 13 pgs.
U.S. Appl. No. 12/207,910, Notice of Allowance mailed Jan. 15, 2015, 10 pgs.
U.S. Appl. No. 12/207,910, Notice of Allowance mailed Jun. 22, 2015, 9 pgs.
U.S. Appl. No. 12/359,939, Office Action mailed Aug. 4, 2015, 24 pgs.
Japanese Notice of Rejection in Application 2014-157742, mailed Jul. 14, 2015, 7 pgs.
Gross, Christian, "This is Site Server! Integrating the Microsoft Index Server with Active Server Pages", printed in Microsoft Interactive Developer, Jul. 1997, No. 2, published by ASCII Corporation, Japan, on Jul. 18, 1997, pp. 75-90. (no English translation).
Chinese Notice of Allowance in Application 201180027027.4, mailed Aug. 27, 2015, 4 pgs.
Korean Office Action in Application 10-2011-7005588, mailed Oct. 15, 2015, 9 pgs.
European Summons to Attend Oral Proceedings in Application 05105672.9, mailed Nov. 6, 2015, 7 pgs.
European Summons to Attend Oral Proceedings in Application 05105672.9, mailed Nov. 30, 2015, 1 page.
Indian Office Action in Application 2260/DELNP/2008, mailed Sep. 22, 2015, 3 pgs.
U.S. Appl. No. 12/207,910, Notice of Allowance mailed Dec. 9, 2015, 8 pgs.
Indian Office Action in Application 1484/DEL/2005, mailed Oct. 5, 2015, 2 pgs.
PCT International Preliminary Report on Patentability Issued in PCT Application No. PCT/US2009/63333, Issuance Date: Mar. 15, 2011, 4 Pages.
Murata, et al., "Information Request Base Search Result Ranking Based on Click Log Analysis", In Journal of Japan Database Society, vol. 7, Issue 4, Mar. 27, 2009, 8 Pages. (W/o English Translation).
U.S. Appl. No. 12/359,939, Appeal Brief filed Feb. 16, 2016, 33 pgs.
Japanese Appeal Decision in Application 2005-175174, mailed Jan. 15, 2016, 48 pgs.
European Summons to attend oral proceedings in Application 05105672.9, mailed Dec. 21, 2015, 1 page.
European Brief Communication in Application 05105672.9, mailed Dec. 21, 2015, 1 page.
Indian Hearing Notice on Application 2260/DELNP/2008, mailed Jan. 29, 2016, 2 pgs.
U.S. Appl. No. 12/207,910, Notice of Allowance mailed Mar. 28, 2016, 8 pgs.
U.S. Appl. No. 12/207,910, Amendment after Notice of Allowance filed Apr. 8, 2016, 3 pgs.
U.S. Appl. No. 12/207,910, USPTO Response to Amendment after Notice of Allowance mailed Apr. 20, 2016, 2 pgs.
European extended Search Report in Application 09813811.8, mailed Mar. 3, 2016, 8 pgs.
Agichtein, Eugene et al., "Improving web search ranking by incorporating user behavior information", Proceedings of the Twenty-Ninth Annual International ACM SIGIR Conference on Research and Development in Information Retrieval ACM New York, NY, USA, vol. 29, Aug. 6, 2006, pp. 19-26.
Lewandowski, Dirk, "Web searching, search engines and information retrieval", Information Services & Use, 2005, pp. 137-147, Retrieved from the Internet: URL:http://citeseerx.ist.psu.edu/viewdoc/download?doi=.10.1.1.301.3944&rep=rep1&type=pdf, retrieved Feb. 23, 2016.
Israel Office Action in Application 210591, mailed Feb. 23, 2016, 8 pgs.
Korean Office Action in Application 10-2011-7005588 mailed Apr. 28, 2016, 4 pgs.
Japanese Office Action in Application 2014-157742, mailed Mar. 30, 2016, 9 pgs.
European Brief Communication in Application 05105672.9, mailed May 11, 2016, 16 pgs.
European Search Report in Application 11790139.7, mailed Jun. 13, 2016, 9 pgs.
European Decision to Refuse in Application 05105672.9, mailed Jun. 16, 2016, 22 pgs.
European Office Action in Application 06804098.9, mailed Jul. 18, 2016, 4 pgs.

* cited by examiner

RE-RANKING SEARCH RESULTS

BACKGROUND

Many users enter queries to retrieve results using one or more search applications. For example, a user may use an Internet search application to find content on the world wide web and they may use an enterprise search application to locate content within an enterprise. In some cases, an administrator may want to rank results differently. For example, a sophisticated administrator may attempt build a better ranking model. Building a ranking model, however, is complex and still may not result in the desired behavior.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Search results are re-ranked based on user-configured ranking rules. The ranking rules alter the ranking of the search results that are returned. For example, a user may desire to: place certain search results at a top/bottom of a ranking of search results; remove some search results; and/or adjust a ranking of some of the search results. A Graphical User Interface (GUI) may be displayed that allows a user to configure the ranking rules (e.g. enter key/value restrictions and to set a boost value). The GUI may also be used to preview an application of one or more of the ranking rules. Query language operators that follow a standard operator syntax are created based on the inputs (e.g. a ranking query operator is created that may include multiple user supplied parameters). The user may also specify a portion of the results from which statistics (e.g. standard deviation, average score) are calculated. For example, a user may specify to calculate statistics for the top N number (e.g. 20) results.

BRIEF DESCRIPTION OF THE DRAWINGS

FIGS. 5-8 illustrate Graphical User Interface displays for configuring a ranking rule.

DETAILED DESCRIPTION

Figure 1:
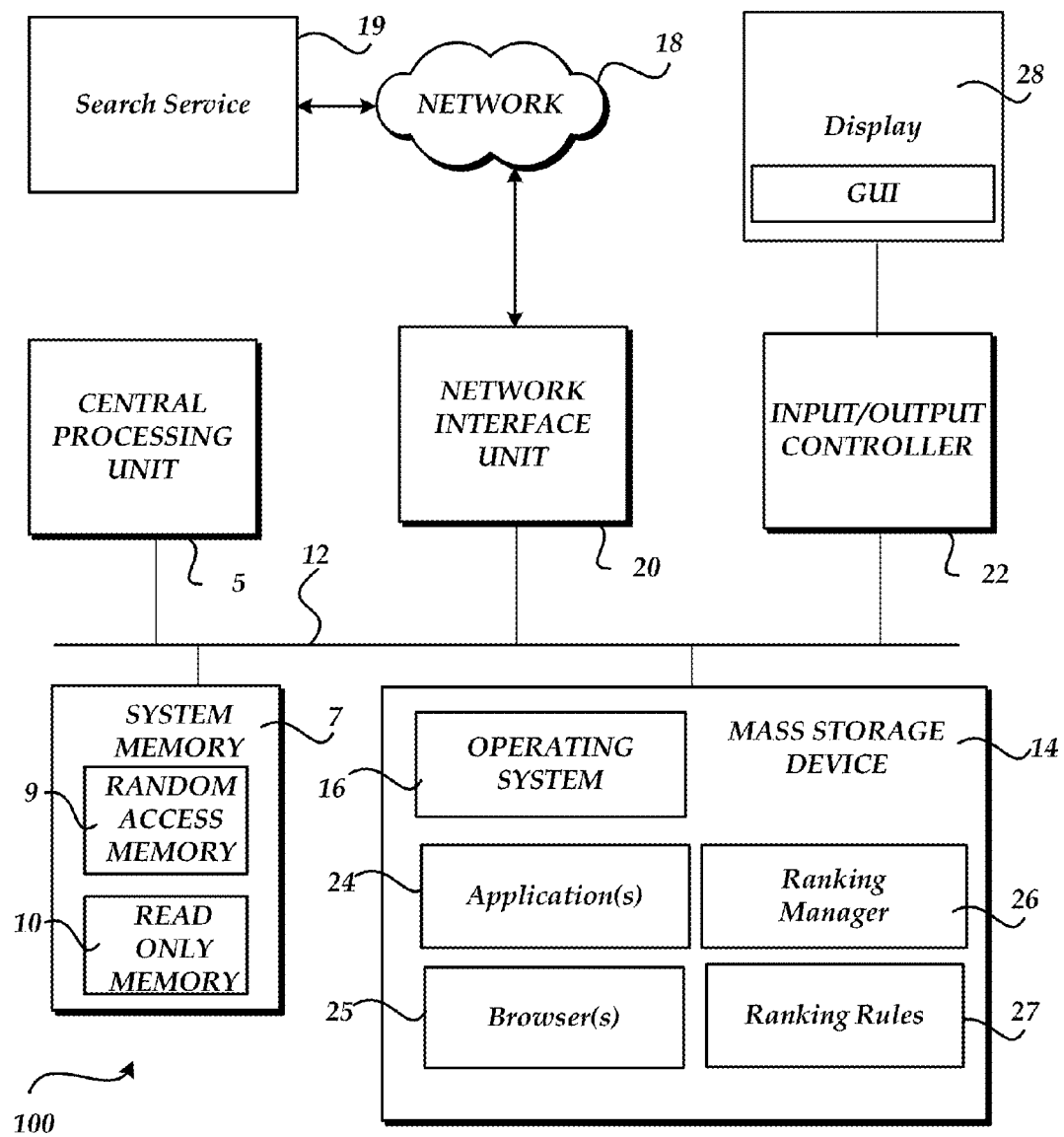
FIG. 1 illustrates an exemplary computing device.

Referring now to the drawings, in which like numerals represent like elements, various embodiments will be described.

FIG. 1 shows an illustrative computer architecture for a computer 100 utilized in various embodiments will be described. The computer architecture shown in FIG. 1 may be configured as a server computing device, a desktop computing device, a mobile computing device (e.g. smartphone, notebook, tablet . . . ) and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application(s) 24, and other program modules, such as Web browser 25, and ranking manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, such as a touch input device.

The touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display 28. The input/output controller 22 may also provide output to one or more display screens, a printer, or other type of output device.

As mentioned briefly above, a number of program modules and data files may be stored in the mass storage device 14 and RAM 9 of the computer 100, including an operating system 16 suitable for controlling the operation of a networked computer, such as the WINDOWS SERVER®, WINDOWS 7® operating systems from MICROSOFT CORPORATION of Redmond, Wash.

The mass storage device 14 and RAM 9 may also store one or more program modules. In particular, the mass storage device 14 and the RAM 9 may store one or more applications 24, such as a re-ranking manager 26, applications 24, ranking rule(s) 27 and may store one or more Web browsers 25. The Web browser 25 is operative to request, receive, render, and provide interactivity with electronic documents, such as a Web page. According to an embodiment, the Web browser comprises the INTERNET EXPLORER Web browser application program from MICROSOFT CORPORATION.

Ranking manager 26 is configured to configure and apply ranking rules. Search results obtained from a ranking model are re-ranked based on user-configured ranking rules. The ranking rules alter the ranking of the search results that are returned by the ranking model. For example, a user may configure ranking rules to: place certain search results at a top/bottom of a ranking of search results; remove some search results; and/or adjust a ranking of some of the search results. A Graphical User Interface (GUI) may be displayed by ranking manager 26 that allows a user to configure the ranking rules (e.g. enter key/value restrictions and to set a boost value). The GUI may also be used to preview an application of one or more of the ranking rules. Query language operators that follow a standard operator syntax are created based on the inputs (e.g. a ranking query operator is created that may include multiple user supplied parameters). The user may also specify a portion of the results from which statistics (e.g. standard deviation (stdb), average score (avgb)) are calculated. For example, a user may specify to calculate statistics for the top N number (e.g. 20) results.

Ranking manager 26 may be a stand-alone application and/or a part of a cloud-based service (e.g. service 19). For example, the functionality of ranking manager 26 may be a part of a cloud based multi-tenant service that provides resources (e.g. services, data . . . ) to different tenants (e.g. MICROSOFT OFFICE 365, MICROSOFT SHAREPOINT ONLINE). Additional details regarding the operation of ranking manager 26 will be provided below.

Figure 2:
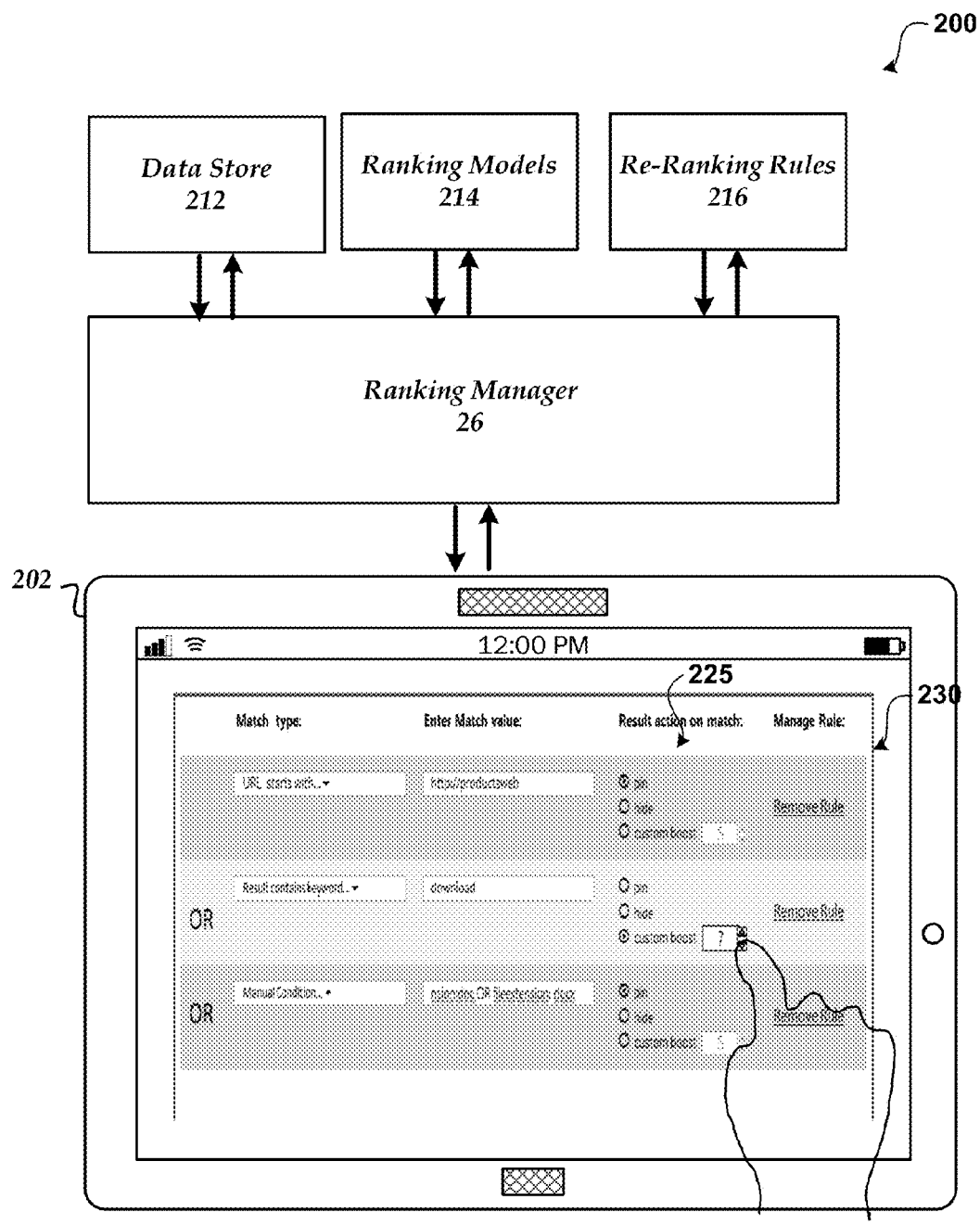
FIG. 2 illustrates an exemplary system for configuring and executing ranking rules.

FIG. 2 illustrates an exemplary system for configuring and executing ranking rules. As illustrated, system 200 includes ranking manager 26, data store 212, ranking models 214 and touch screen input device/display 202 (e.g. slate).

Ranking manager 26 is configured to receive input from a user (e.g. using touch-sensitive input device 202 and/or keyboard input (e.g. a physical keyboard and/or SIP)) for configuring ranking rules.

Touch input system 200 as illustrated comprises a touch screen input device/display 202 that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micromachined accelerometers, piezoelectric devices, capacitive sensors, resistive sensors, inductive sensors, laser vibrometers, and LED vibrometers.

As illustrated, touch screen input device/display 202 shows an exemplary GUI display 230 for editing and creating ranking rules. The ranking manager 26 is designed to allow a user to create one or more ranking rules that are applied to search results that may change a rank of a returned search result. The ranking rules may be applied at different times. For example, the ranking rules may be applied for different sets of search results, at different time in obtaining search results, and the like.

Many times, a user (e.g. a search administrator) may desire to re-order search results. For example, a user may like a result to be placed at/near the top of the results list.

According to an embodiment, when several results are desired to be at the top, they are presented in the relative order they occurred within the results list. A user may also specify a ranking for the results.

Users may also like a result to be removed from the visible results. For example, the result may be moved to a bottom of the results. According to an embodiment, when several results are required to be at the bottom, they are placed there in the relative order they occurred within the original results list.

Users may also like to move results that are considered basically higher or lower amongst the relevant results.

GUI 230 may be used to create one or more rules to re-rank results. As illustrated, a user has used GUI 230 to configure three ranking rules. A user may select the "pin" option to move matching results (as specified by the match type and match value for the rule) to the top/bottom of the search results. A user may also supply a custom boost value by specifying a value between a bottom value (e.g. −10) and a top value (10). Other values/range of values may be used. A boost value of 10 takes a result in the middle of the relevant results and moves it to the top. A boost value of −10 takes a result in the middle of the relevant results and puts it at the bottom of those results (not to the bottom of the whole list).

The user supplied parameter values may be mapped into a query ranking expressions as follows. Assume LARGESCORE is a score larger than any expected score in the system (e.g. 1,000,000). UVAL=="to top" is mapped to: RERANK(cb=LARGESCORE/2, n=20)<matchexpression>. UVAL=="to bottom" is mapped to: RERANK(cb=−LARGESCORE, n=20)<matchexpression>. According to an embodiment, when there are two rules, one which pins a result to the top and the other that hides it on the bottom, the hiding rule will win.

The mapping may be generalized as: −10<=UVAL <=10 maps to: RERANK(cb=UVAL/10, stdb=UVAL/10).

The following table may be used to assist in determining what to do for each of the parameters that may be specified by a user.

| Boost type | cb | rb | pb | avgb | stdb | f |
| --- | --- | --- | --- | --- | --- | --- |
| To Top | LARGESCORE div 2 | 0 | 0 | 0 | 0 | 0 |
| To Bottom | — 3. LARGESCORE div 4 | 0 | 0 | 0 | 0 | 0 |
| −10 <= UVAL <= 10 | 1. | 0. | 0. | 0. | 1. | 0 |

According to an embodiment, a user may configure the values within the table to provide different weightings for each type of boost.

A user may specify common query restrictions (e.g. title, body, keyword, file extension, etc.) to specify the match type and determine matching results to apply the specified action for the re-ranking. A user may also specify the match value (e.g. gender:male, keyword:Brand) using the GUI 230.

In the current example, a user has specified three rules that are combined using an OR operator. Other operations and conditionals may be used to join the user specified ranking rules. Once the user has configured the ranking rules, the user may preview a set of results and when satisfied with the rule submit them to the ranking manager 26.

Ranking manager 26 is configured to create a re-ranking operator that includes the user specified parameters that influence how much the rank is changed for a result. According to an embodiment, the re-ranking operator formula is of the form:

$$r_i = a + b(\max - \min) + c(r_i - \min) + d \cdot \overline{x} + e \cdot \overline{\sigma} + f \cdot \frac{\overline{x} \cdot \sigma^2}{\overline{x^2}}$$

where $r_i$ is the rank value of the ith hit, max(min) is the max(min) rank value of all hits, $\overline{x}$ is the average rank value of the hits, $\overline{\sigma}$ is the sqrt (variance) of the rank values, $\overline{x^2}$ is the average of the sum of the square roots of the rank values of the hits, and a, b, c, d, e, and f are user configurable/supplied parameters. Parameter "a" is used to add a value to the ranking. Parameter "b" multiples the max minus min. Parameter "c" is a multiplier on rank value. Parameter "d" is a multiplier of an average score. Parameter "e" is a multiplier on the standard deviation. Parameter "f" is a multiplier of value for another statistical function. As can be seen, in contrast to prior methods that allowed a single boost parameter to be added to a score, a user may configure a variety of different parameters that affect a re-ranking of a search result. More or fewer statistical calculations may be included in the ranking formula. According to an embodiment, the default values of the parameters are set to zero (0). The re-ranking formula may be surfaced in different ways. For example, rather than using an OM call, the re-ranking operators can be surfaced as part of a query syntax as follows: Query RERANK(cb=1,rb=0,pb=0,avgb=0, stdb=0.5,f=0) download.

RERANK can be nested such as <matchexpression>RERANK1(params) <matchexpression>RERANK2(params)<matchexpression>. According to an embodiment, the statistics are computed once, and RERANK1 is computed before RERANK2.

Instead of computing statistics for all of the results, a user may configure/restrict the calculation to use a portion of the results. Computing the statistics for the relevant results is directed at providing better statistics that are more relevant to a user than computing statistics using all of the results. For example, for results with high recall, the computation of statistics (e.g. standard deviation (stdb) and average score (avgb)) are likely to be skewed to the head of the results list when using all of the results. As a result, avgb could be very low and stdb could be close to 0. A user may configure the results to use for calculation of the statistics (e.g. select the top N results (assuming them to be relevant)). According to an embodiment, the default number of results used to compute the statistics is 20. The value may be set through a GUI and/or through an OM.

The following examples describe various uses of ranking rules and are provided for explanatory purposes only, and is not to be considered limiting.

Assume that a store manager would like to list Brand 1 of laptops higher in the product listings for women visiting the laptop category, as the Brand 1 laptops are popular with women. For men, the product listing of the laptops are sorted according to normal sorting rules. The store manager (or some authorized user) creates a rule that triggers for "gender:women" and "term:Products/Computers/Laptops" and the desired behavior is that RERANK for the term Brand 1 is added to the query when retrieving the result table used for the product listings. According to an embodiment, the rule is active until it is disabled (automatically/manually).

In a second example, assume that a search admin has configured a results block for reports in the enterprise search center. The search admin's query filters results that provide business data, but when the search admin tries the rule, the ranking is not quite right. Instead, the search admin would like results from his annual reports to be surfaced higher, and wants quarterly reports to come out higher in the ranking. The search admin configures the query to boost documents with the term "quarterly reports" in the title and those in the reports folder via a GUI, such as GUI 230.

For another example, assume that John is a business manager working for an online bookstore. He has a product catalogue for his books, magazines and other inventory. As the curates a catalogue page for thrillers, he decides that he wants to push books by his close partners, BestBooks for this category, and all e-books. He builds an appropriate query for this via a query rules for the thriller category.

For yet another example, assume that Dmitriy Jacobson is a search admin for an enterprise search portal at Ranking Technologies, Inc. He would like to add Linked-in data (via Bing) when he recognizes people names in search. In order to make the query more targeted, he adds words for his company to the query rules, for example, for his name at Ranking, he formulates the query "Dmitriy Jacobson, Ranking Technologies". If no results appear, he would like to build a rule that fills them in with "Dmitriy Jacobson Ranking Technologies"; if all else fails, he would like to try just "Dmitriy Jacobson". He can carry this out simply with a single query rule with two results blocks routed to the same search.

Figure 3:
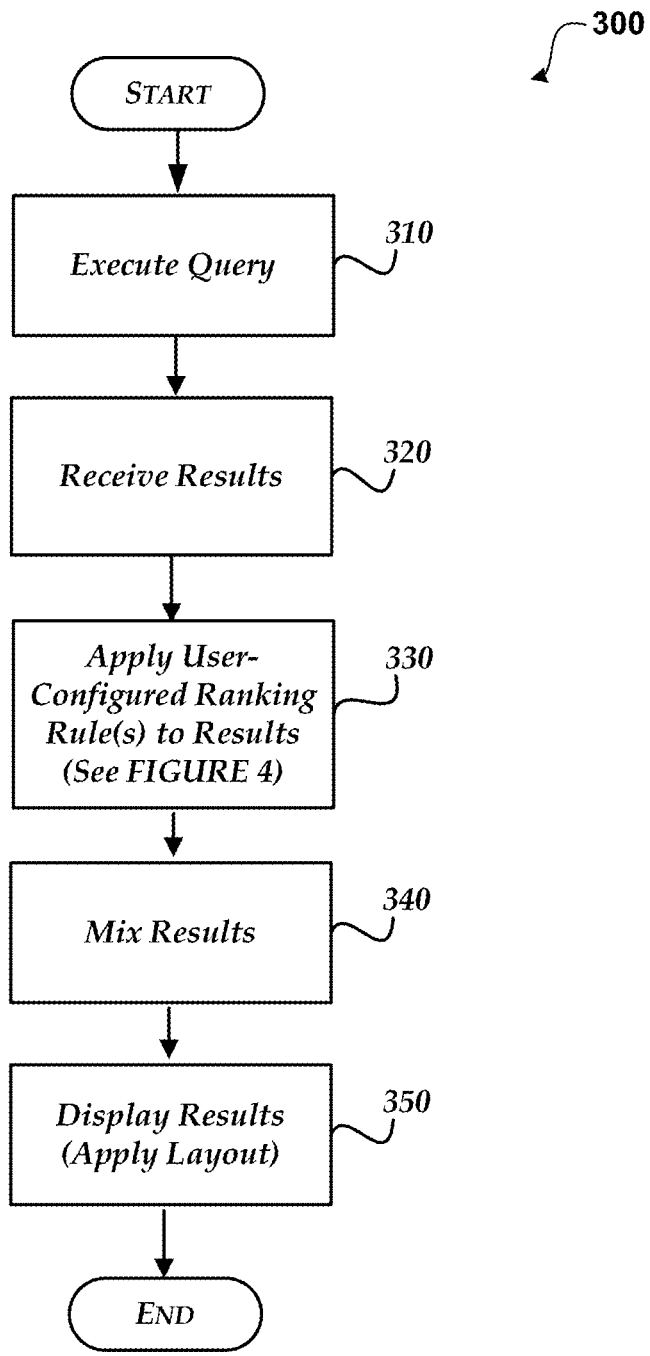
FIG. 3 illustrates an overview of applying a ranking rule to search results.
Figure 4:
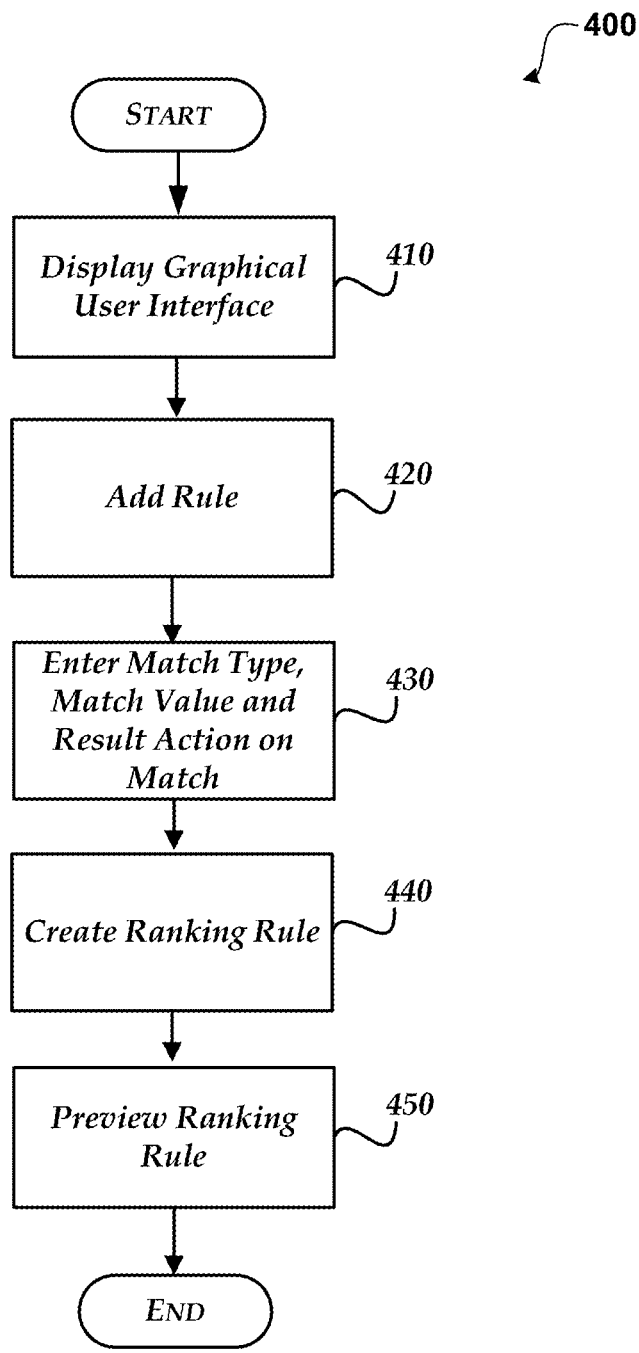
FIG. 4 shows a process for creating and previewing one or more ranking rules.

FIGS. 3-4 show an illustrative process for configuring and applying ranking rules. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 3 illustrates an overview of applying a ranking rule to search results.

After a start operation, the process 300 flows to operation 310, where a search query that is received is executed. After receiving a query, the query is executed using one or more search engines and one or more sources to obtain results.

Moving to operation 320, the search results are received. The results may come from one or more sources and may be returned in one or more formats. For example, a first search application may return search results in a first format, whereas another search provider returns results in another format.

Flowing to operation 330, any ranking rules are applied to the search results. As discussed herein, application of the ranking rule may result in one or more of the search results being re-ranked. More than one ranking rule may be applied to the search results. Further, the ranking rules may be applied to a combined set of search results that come from different sources and/or applied to each set of search results individually.

Transitioning to operation 340, the returned results from each of the queries are mixed. According to an embodiment, the re-ranked results from each source are put in a separate block. The blocks which are displayed, their order, and their location within the result list may be determined manually/automatically. For example, a user may specify how the results are displayed and/or the display of the results may be determined through machine learning. According to an embodiment, results from each of the determined alternate sources are stored in different user blocks.

Moving to operation 350, the results are displayed. The mixed results may be evaluated against display rule. When a rule is located whose condition matches the result, the corresponding display layout is applied to that result.

The process then moves to an end operation and returns to processing other actions.

FIG. 4 shows a process for creating and previewing one or more ranking rules.

After a start operation, the process 400 flows to operation 410, where a GUI is displayed that displays options for allowing a user to configure a ranking rule (See FIGS. 5-8 for exemplary GUI displays).

Moving to operation 420, a user selects an option to add a ranking rule. In response to selecting the option, a user configures a new rule.

Flowing to operation 430, a user defines the rule by specifying a match type, a match value for the specified match type and a re-ranking action to perform on any search results that meet the specified match type and match value.

Transitioning to operation 440, the ranking rule may be created once the specified values are received. According to an embodiment, validation occurs before allowing a user to save the ranking rule.

Moving to operation 450, the ranking rule may be previewed to test how it will be applied to search results.

The process then moves to an end operation and returns to processing other actions.

Figure 5:
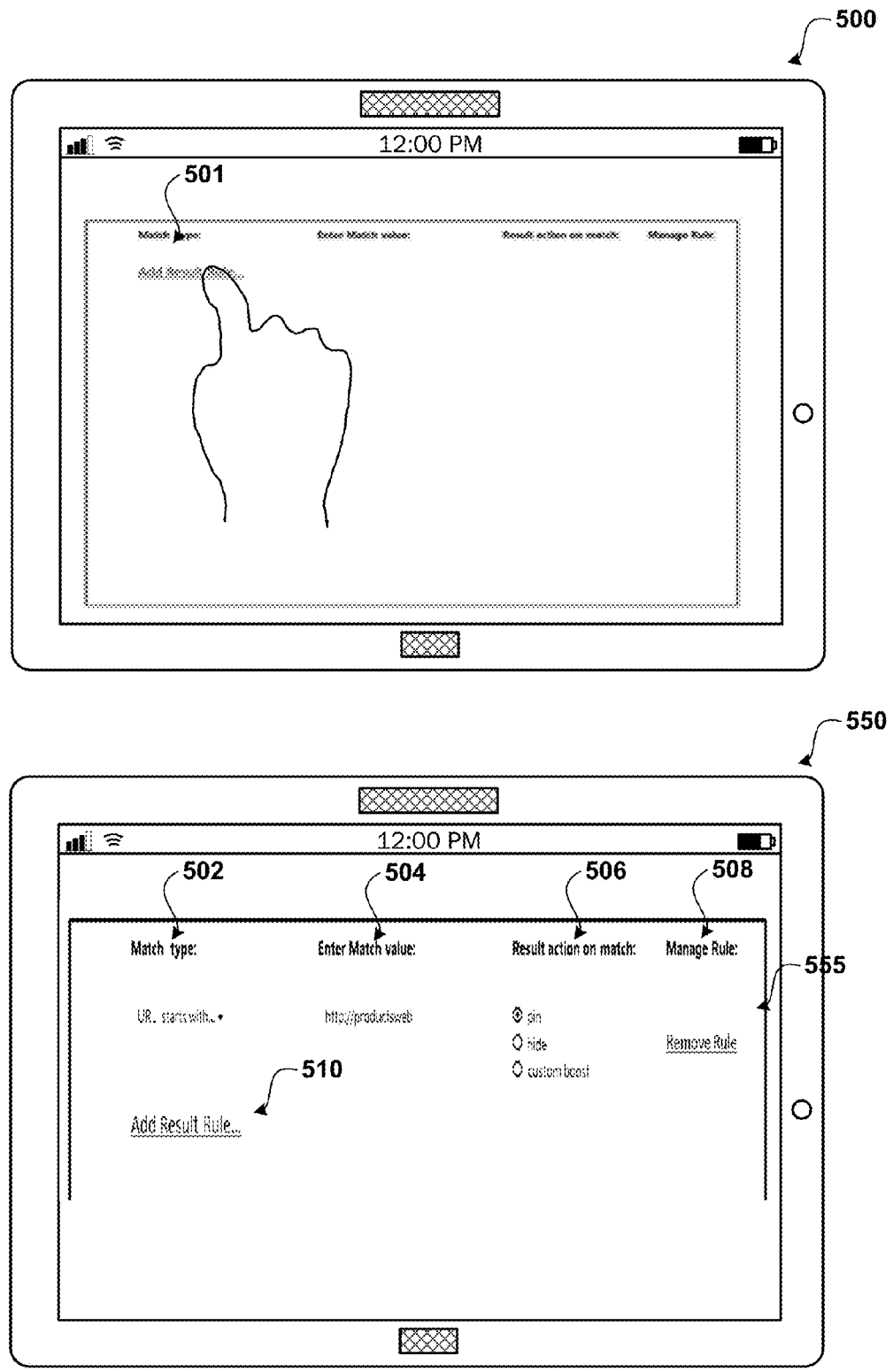

FIG. 5 shows an exemplary GUI for creating a rule.

As illustrated, display 500 shows a user selecting to add a ranking rule (501).

Display 550 shows the GUI with a rule template 555 that is displayed in response to receiving a selection to add a new rule. The rule template 555 includes a match type 502, a match value 504, a result action on match 506 and a manage rule 508 section. According to an embodiment, the match type 502 is auto filled with "URL starts with" as a default match type. A user may select a variety of match types to enter into the match type area, such as "Result contains keyword . . . ", "Title contains keyword . . . ", "Title matches phrase . . . ", "URL is prefixed by . . . ", "URL matches . . . ", "Content type is . . . ", "File extension matches . . . ", "Result has the tag . . . ", and specifying a manual condition (See FIG. 6 for exemplary display). The manual condition is used to enter a match condition that is not contained within the default listing. The manual condition may be specified using different methods (e.g. a query language, Boolean operators, and the like).

The match value 504 is used to obtain the desired match value. For example, if a user enters "Title contains keyword" in match type 502, then the user would enter the keyword(s) in the title that they are interested in.

Figure 6:
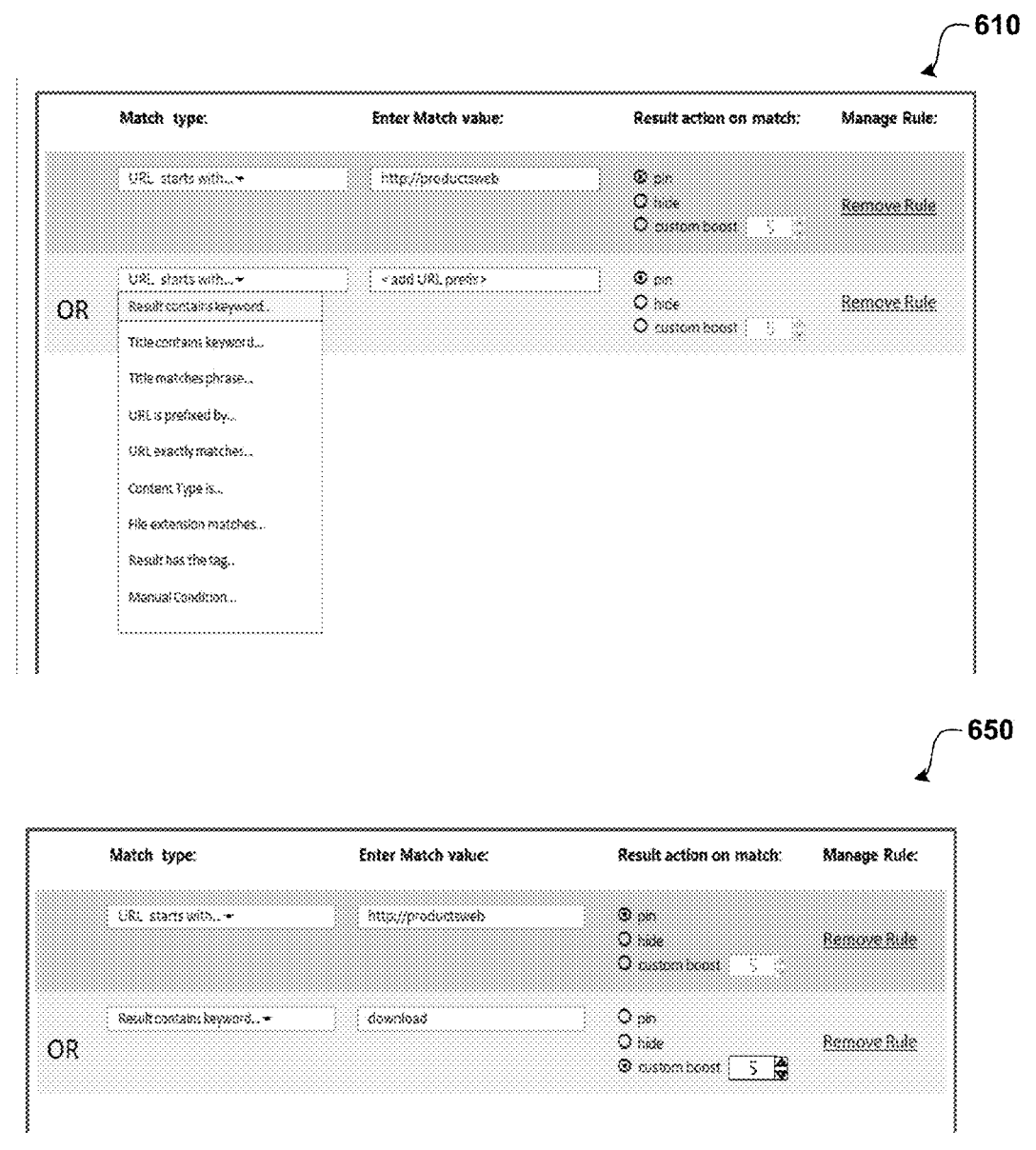

The result action on match 506 and manage rule 508 indicate what kind of action to carry out (pin="to top"), (hide="to bottom") and custom boost is $-10 <= UVAL <= 10$. When a rule is valid, the add rule link 510 is enabled FIG. 6 shows a user adding another rule.

Display 610 shows the addition of a second rule and display 650 shows that the user has included a condition that boosts a result when it contains the keyword "download."

Figure 7:
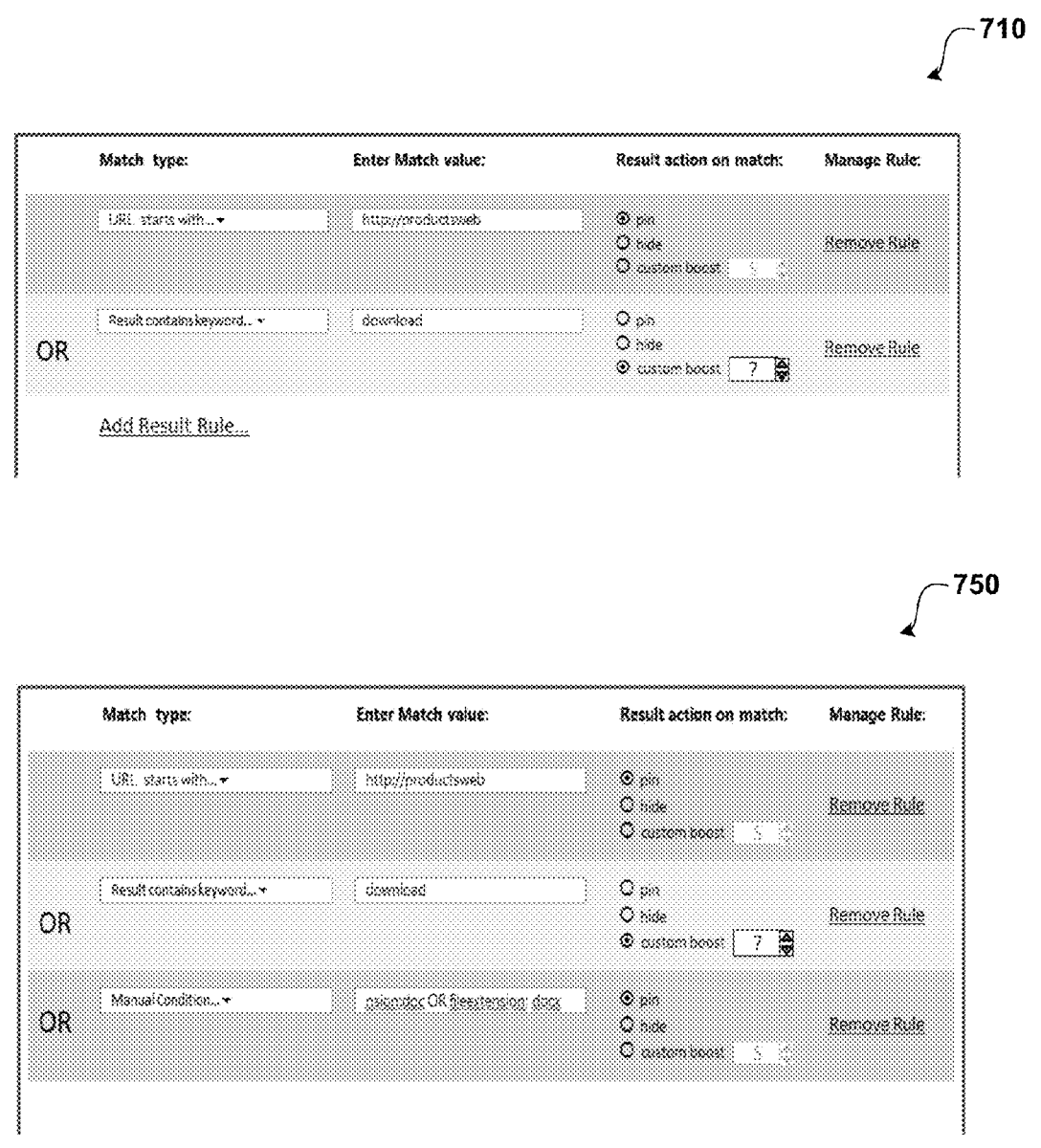

FIG. 7 illustrates changing a custom boost.

Display 710 shows the user changing the custom boost of the second rule from 5 to 7.

Display 750 shows the user entering a manual condition in the third rule. When manual conditions are selected, an arbitrary query expression can be input into the match value. In the current example, a user has added the expression "fileextension:doc OR fileextension:docx" as the manual condition.

Figure 8:
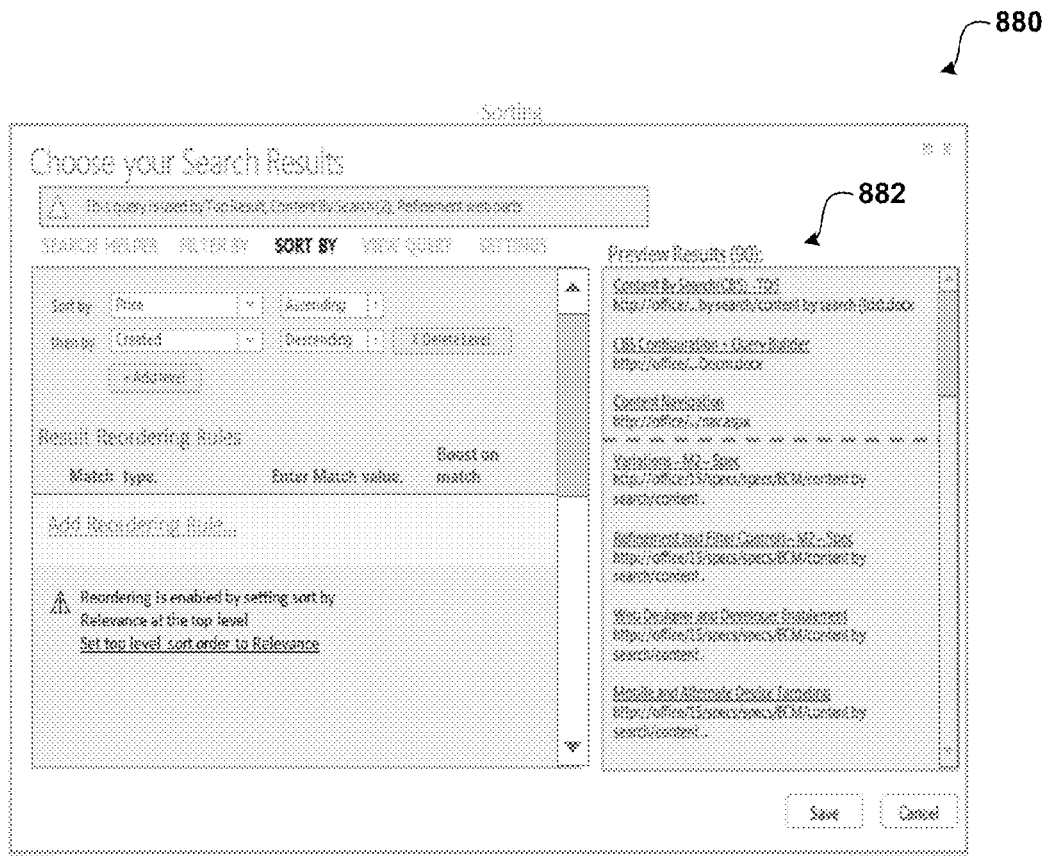
Figure 8:
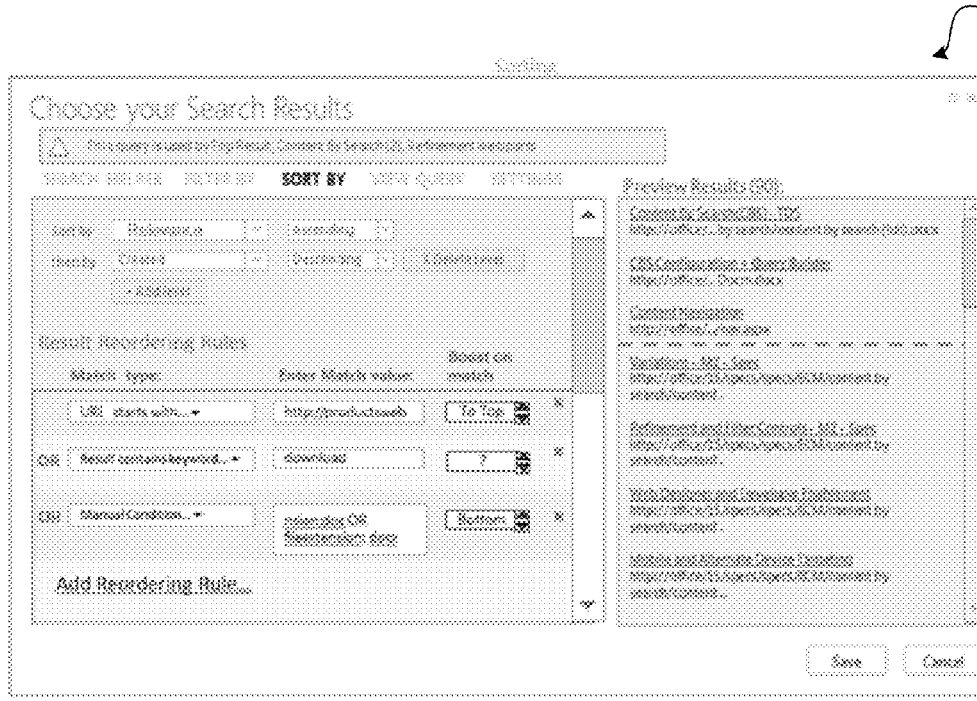

FIG. 8 shows an exemplary display for previewing results from applying a ranking rule.

As illustrated, display 880 shows preview results 882 that display exemplary results within the GUI used for configuring the rule.

Display 884 shows sorting by relevance enabled that shows the example rules shown in FIG. 7.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 9:
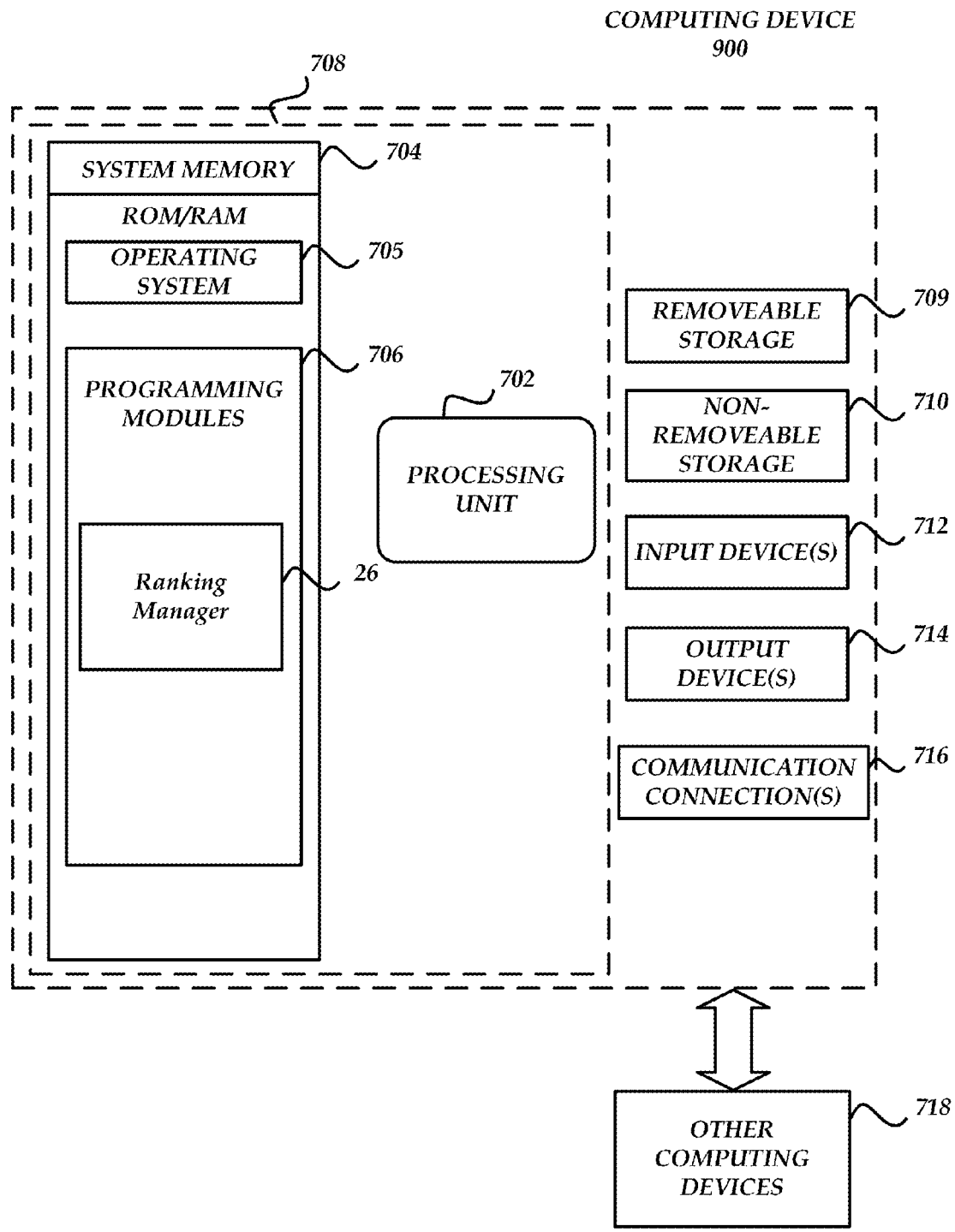
FIGS. 9-11 and the associated descriptions provide a discussion of a variety of operating environments in which embodiments of the invention may be practiced.
Figure 10A:
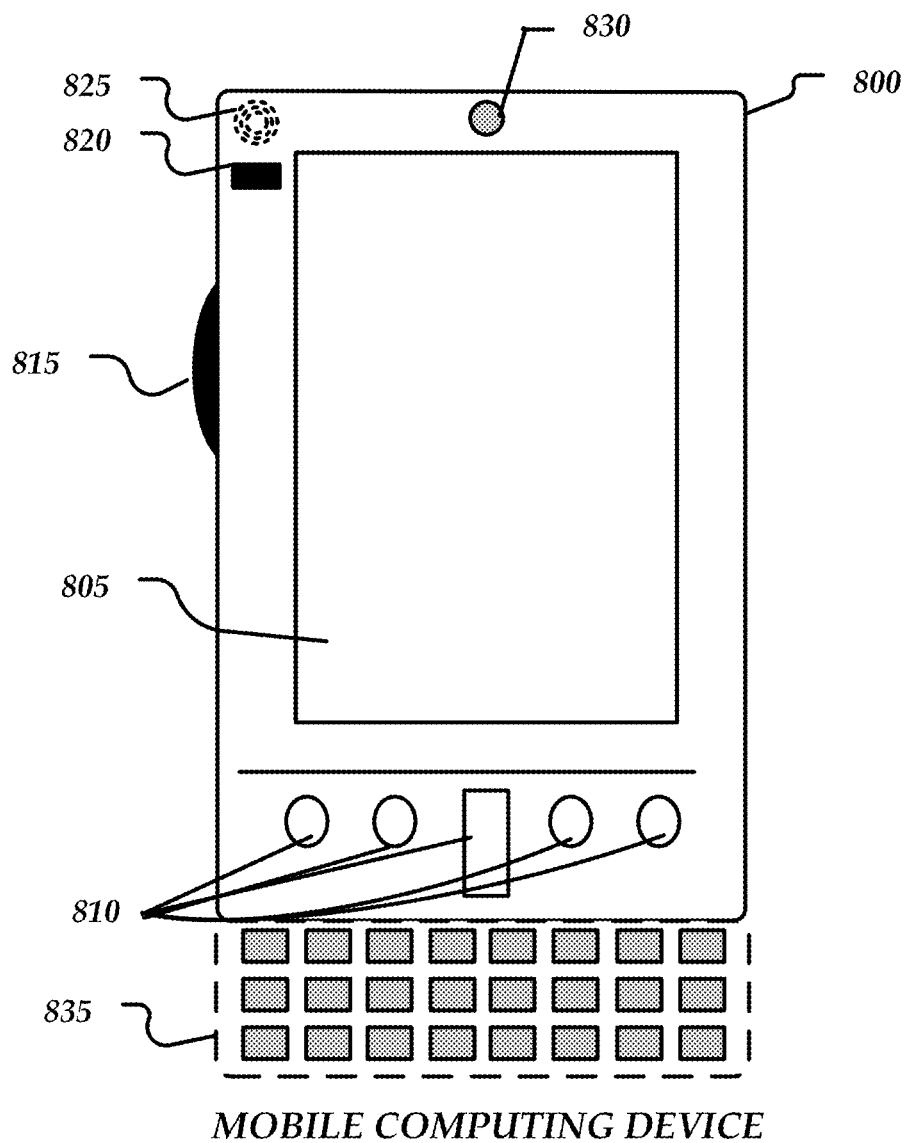
Figure 10B:
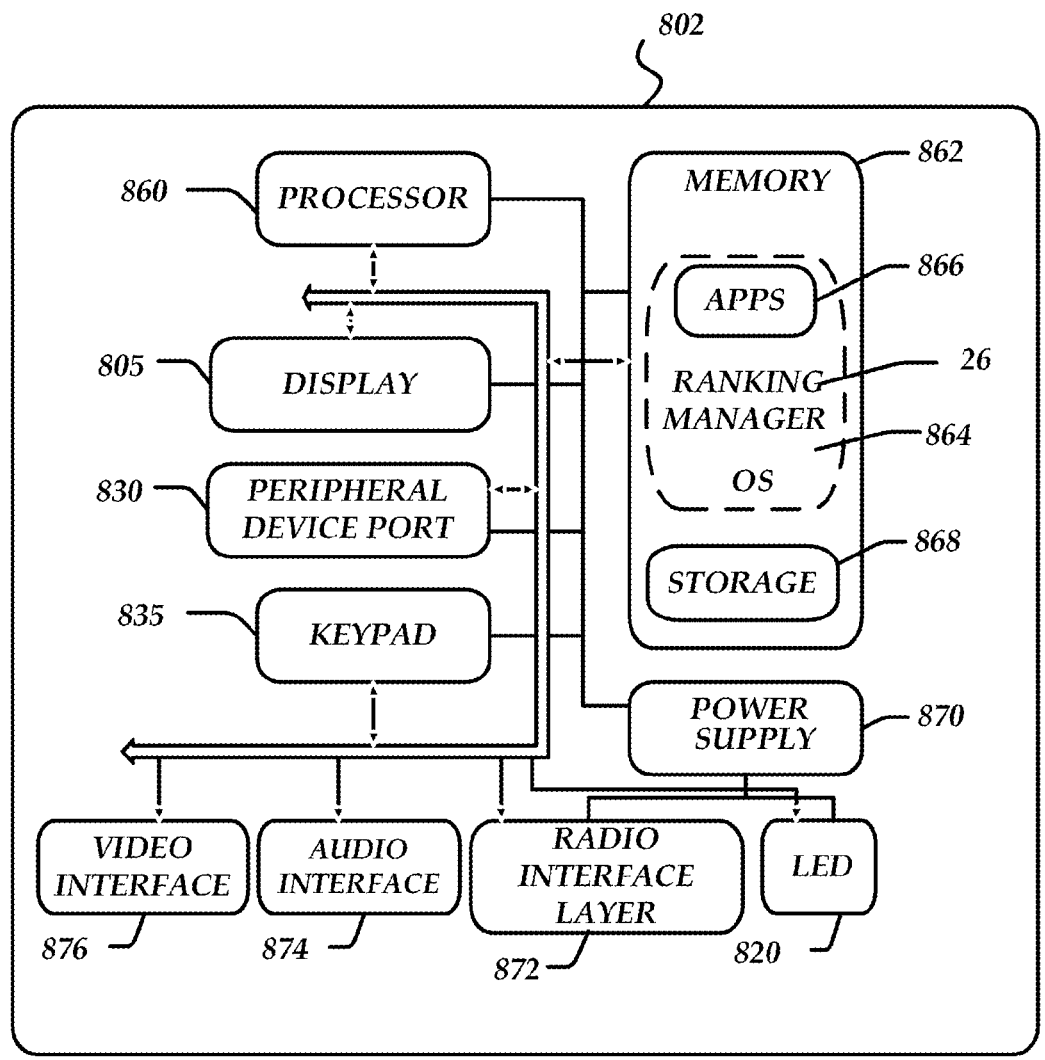
Figure 11:
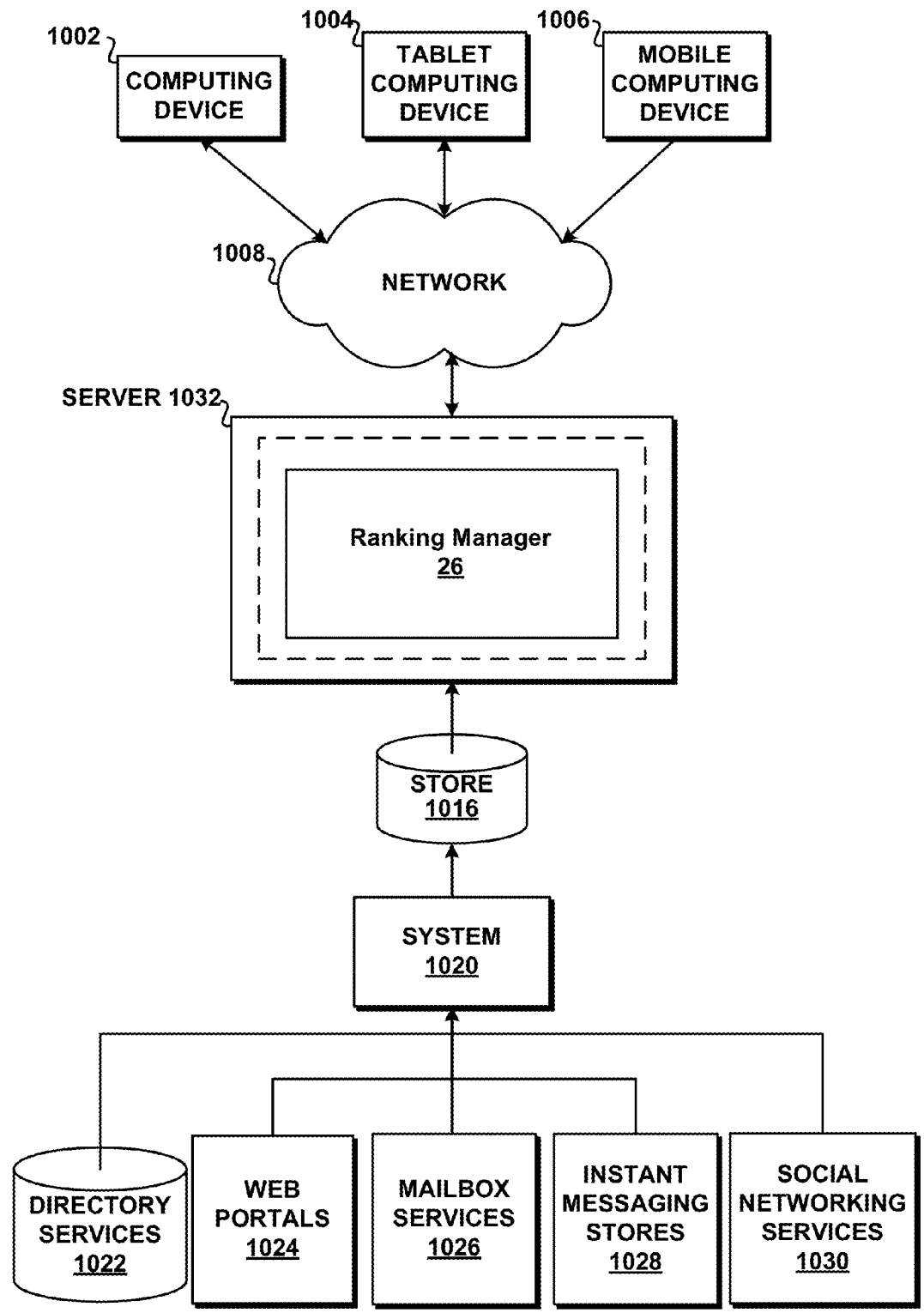

FIGS. 9-11 and the associated descriptions provide a discussion of a variety of operating environments in which embodiments of the invention may be practiced. However, the devices and systems illustrated and discussed with respect to FIGS. 9-11 are for purposes of example and illustration and are not limiting of a vast number of computing device configurations that may be utilized for practicing embodiments of the invention, described herein.

FIG. 9 is a block diagram illustrating example physical components of a computing device 900 with which embodiments of the invention may be practiced. The computing device components described below may be suitable for the computing devices described above. In a basic configuration, computing device 900 may include at least one processing unit 702 and a system memory 704. Depending on the configuration and type of computing device, system memory 704 may comprise, but is not limited to, volatile (e.g. random access memory (RAM)), non-volatile (e.g. read-only memory (ROM)), flash memory, or any combination. System memory 704 may include operating system 705, one or more programming modules 706, and may include a web browser application 720. Operating system 705, for example, may be suitable for controlling computing device 900's operation. In one embodiment, programming modules 706 may include a ranking manager 26, as described above, installed on computing device 900. Furthermore, embodiments of the invention may be practiced in conjunction with a graphics library, other operating systems, or any other application program and is not limited to any particular application or system. This basic configuration is illustrated in FIG. 9 by those components within a dashed line 708.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by a removable storage 709 and a non-removable storage 710.

As stated above, a number of program modules and data files may be stored in system memory 704, including operating system 705. While executing on processing unit 702, programming modules 706, such as the ranking manager may perform processes including, for example, one or more methods 300 and 400 as described above. The aforementioned process is an example, and processing unit 702 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 900 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of device 900. Computing device 900 may also have input device(s) 712 such as a keyboard, a mouse, a pen, a sound input device, a touch input device, etc. Output device(s) 714 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A and 10B illustrate a suitable mobile computing environment, for example, a mobile telephone, a smartphone, a tablet personal computer, a laptop computer, and the like, with which embodiments of the invention may be practiced. With reference to FIG. 10A, an example mobile computing device 800 for implementing the embodiments is illustrated. In a basic configuration, mobile computing device 800 is a handheld computer having both input elements and output elements. Input elements may include touch screen display 805 and input buttons 815 that allow the user to enter information into mobile computing device

800. Mobile computing device 800 may also incorporate an optional side input element 815 allowing further user input. Optional side input element 815 may be a rotary switch, a button, or any other type of manual input element. In alternative embodiments, mobile computing device 800 may incorporate more or less input elements. For example, display 805 may not be a touch screen in some embodiments. In yet another alternative embodiment, the mobile computing device is a portable phone system, such as a cellular phone having display 805 and input buttons 815. Mobile computing device 800 may also include an optional keypad 835. Optional keypad 815 may be a physical keypad or a "soft" keypad generated on the touch screen display.

Mobile computing device 800 incorporates output elements, such as display 805, which can display a graphical user interface (GUI). Other output elements include speaker 825 and LED light 820. Additionally, mobile computing device 800 may incorporate a vibration module (not shown), which causes mobile computing device 800 to vibrate to notify the user of an event. In yet another embodiment, mobile computing device 800 may incorporate a headphone jack (not shown) for providing another means of providing output signals.

Although described herein in combination with mobile computing device 800, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 10B is a block diagram illustrating components of a mobile computing device used in one embodiment, such as the computing device shown in FIG. 10A. That is, mobile computing device 800 can incorporate system 802 to implement some embodiments. For example, system 802 can be used in implementing a "smart phone" that can run one or more applications similar to those of a desktop or notebook computer such as, for example, browser, e-mail, scheduling, instant messaging, and media player applications. In some embodiments, system 802 is integrated as a computing device, such as an integrated personal digital assistant (PDA) and wireless phone.

One or more application programs 866 may be loaded into memory 862 and run on or in association with operating system 864. Examples of application programs include phone dialer programs, e-mail programs, PIM (personal information management) programs, word processing programs, spreadsheet programs, Internet browser programs, messaging programs, and so forth. System 802 also includes non-volatile storage 868 within memory 862. Non-volatile storage 868 may be used to store persistent information that should not be lost if system 802 is powered down. Applications 866 may use and store information in non-volatile storage 868, such as e-mail or other messages used by an e-mail application, and the like. A synchronization application (not shown) may also reside on system 802 and is programmed to interact with a corresponding synchronization application resident on a host computer to keep the information stored in non-volatile storage 868 synchronized with corresponding information stored at the host computer. As should be appreciated, other applications may be loaded into memory 862 and run on the device 800, including the ranking manager 26, described above.

System 802 has a power supply 870, which may be implemented as one or more batteries. Power supply 870 might further include an external power source, such as an AC adapter or a powered docking cradle that supplements or recharges the batteries.

System 802 may also include a radio 872 that performs the function of transmitting and receiving radio frequency communications. Radio 872 facilitates wireless connectivity between system 802 and the "outside world", via a communications carrier or service provider. Transmissions to and from radio 872 are conducted under control of OS 864. In other words, communications received by radio 872 may be disseminated to application programs 866 via OS 864, and vice versa.

Radio 872 allows system 802 to communicate with other computing devices, such as over a network. Radio 872 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 802 is shown with two types of notification output devices; LED 820 that can be used to provide visual notifications and an audio interface 874 that can be used with speaker 825 to provide audio notifications. These devices may be directly coupled to power supply 870 so that when activated, they remain on for a duration dictated by the notification mechanism even though processor 860 and other components might shut down for conserving battery power. LED 820 may be programmed to remain on indefinitely until the user takes action to indicate the powered-on status of the device. Audio interface 874 is used to provide audible signals to and receive audible signals from the user. For example, in addition to being coupled to speaker 825, audio interface 874 may also be coupled to a microphone 820 to receive audible input, such as to facilitate a telephone conversation. In accordance with embodiments of the present invention, the microphone 820 may also serve as an audio sensor to facilitate control of notifications, as will be described below. System 802 may further include video interface 876 that enables an operation of on-board camera 830 to record still images, video stream, and the like.

A mobile computing device implementing system 802 may have additional features or functionality. For example, the device may also include additional data storage devices (removable and/or non-removable) such as, magnetic disks, optical disks, or tape. Such additional storage is illustrated in FIG. 10B by storage 868. Computer storage media may include volatile and nonvolatile, removable and non-removable media implemented in any method or technology for storage of information, such as computer readable instructions, data structures, program modules, or other data.

Data/information generated or captured by the device 800 and stored via the system 802 may be stored locally on the device 800, as described above, or the data may be stored on any number of storage media that may be accessed by the device via the radio 872 or via a wired connection between the device 800 and a separate computing device associated with the device 800, for example, a server computer in a distributed computing network such as the Internet. As should be appreciated such data/information may be accessed via the device 800 via the radio 872 or via a distributed computing network. Similarly, such data/information may be readily transferred between computing devices for storage and use according to well-known data/information transfer and storage means, including electronic mail and collaborative data/information sharing systems.

FIG. 11 illustrates a system architecture for re-ranking results, as described above.

Components managed via the ranking manager 26 may be stored in different communication channels or other storage types. For example, components along with information from which they are developed may be stored using directory services 1022, web portals 1024, mailbox services 1026, instant messaging stores 1028 and social networking sites 1030. The systems/applications 26, 1020 may use any of these types of systems or the like for enabling management and storage of components in a store 1016. A server 1032 may provide communications for managed components and content to clients. As one example, server 1032 may be a web server providing collaborative display component management communications and content over the web. Server 1032 may provide online display component management and content over the web to clients through a network 1008. Examples of clients that may obtain display component management communications and content include computing device 1002, which may include any general purpose personal computer, a tablet computing device 1004 and/or mobile computing device 1006 which may include smart phones. Any of these devices may obtain display component management communications and content from the store 1016.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for re-ranking search results, comprising:
   receiving search results that are ranked; and
   applying a ranking rule to the search results that re-ranks the search results, wherein the ranking rule is defined by user input and includes user-input specified parameters that influence how a result within the search results is re-ranked using statistical information calculated based on the search results, wherein the statistical information comprises at least one statistical value calculated based on rank values of a plurality of the search results, wherein the ranking rule includes a multiplier value that is multiplied against at least one of: a maximum rank value of the rank values minus a minimum rank value of the rank values; a rank value of the ranks values minus the minimum rank value of the rank values; an average rank value of the rank values; and a standard deviation of the rank values.

2. The method of claim 1, further comprising defining the ranking rule using a Graphical User Interface (GUI) that displays options used for setting the user-input specified parameters.

3. The method of claim 2, wherein the GUI comprises a display of a pin option that ranks results that match a specified condition to a specified location within the displayed search results and a boost option that changes a ranking by one of: increasing a ranking value and decreasing a ranking value.

4. The method of claim 2, wherein the GUI comprises displaying a hide option that removes a portion of the search results from the display.

5. The method of claim 1, wherein the ranking rule follows a standard query syntax.

6. The method of claim 5, wherein the ranking rule is converted into nested ranking directives along with other ranking rules that are added to a query.

7. The method of claim 1, wherein the ranking rule comprises a ranking equation, wherein the ranking equation is $$r_i = a + b(\max - \min) + c(r_i - \min) + d \cdot \bar{x} + e \cdot \sigma + f \cdot \frac{\bar{x} \cdot \sigma^2}{\overline{x^2}},$$

where $r_i$ is the rank value of the ith hit, max/min is the max/min rank value of all hits, $\bar{x}$ is the average rank value of the hits, $\sigma$ is the sqrt (variance) of the rank values, $\overline{x^2}$ is the average of the sum of the square roots of the rank values of the hits, and a, b, c, d, e, and f are user-input supplied parameters.

8. The method of claim 1, further comprising computing statistics for a portion of the search results determined from a user-input defined value.

9. A computer storage medium having computer-executable instructions for re-ranking search results, comprising:
   receiving search results that are ranked;
   computing statistics based on rank values of a portion of the search results, wherein the portion comprises a plurality of the search results;
   applying an expression that comprises nested ranking rules defined by a user-input to the search results that re-ranks the search results, wherein at least one of the nested ranking rules includes user-input specified parameters that influence how a result within the search results is re-ranked using the statistics and at least one of the nested ranking rules includes a multiplier value that is multiplied against at least one of: a maximum rank value of the rank values minus a minimum rank value of the rank values; a rank value of the rank values minus the minimum value of the rank values; an average rank value of the rank values; and a standard deviation of the rank values; and
   after applying the expression to the search results, displaying the search results.

10. The computer storage medium of claim 9, further comprising defining the expression using a Graphical User Interface (GUI) that displays options used for setting the user-input specified parameters.

11. The computer storage medium of claim 10, wherein the GUI comprises a display of a pin option that ranks results that match a specified condition to a specified location within the displayed search results and a boost option that changes a ranking by one of: increasing a ranking value and decreasing a ranking value.

12. The computer storage medium of claim 9, wherein the GUI comprises displaying a match type section, a match value section, and a result action on match section.

13. The computer storage medium of claim 9, wherein when the match type section is set to a manual condition, the match value section receives a match rule that follows a standard query syntax.

14. The computer storage medium of claim 9, wherein one or more of the nested ranking rules is previewed.

15. The computer storage medium of claim 9, wherein at least one of the nested ranking rules includes a multiplier value that is multiplied against one or more of: a maximum rank value minus a minimum rank value; a rank value minus the minimum value; an average rank value; and a standard deviation of the rank value.

16. A system for re-ranking search results, comprising:
   a network connection that is coupled to tenants of the multi-tenant service;
   a processor and a computer-readable medium;
   an operating environment stored on the computer-readable medium and executing on the processor; and
   a ranking manager operating under the control of the operating environment and operative to actions comprising:
   receiving search results that are ranked;
   computing statistics based on rank values of a portion of the search results, wherein the portion comprises a plurality of the search results;
   applying a ranking rule defined by a user-input through a Graphical User Interface (GUI) to the search results that re-ranks the search results, wherein the ranking rule includes user-input specified parameters that influence how a result within the search results is re-ranked using the statistics and the ranking rule includes a multiplier value that is multiplied against at least one of: a maximum rank value of the rank values minus a minimum rank value of the rank values; a rank value of the ranks values minus the minimum rank value of the rank values; an average rank value of the rank values; and a standard deviation of the rank values; and
   displaying the search results.

17. The system of claim 16, wherein the GUI comprises a display of a pin option that ranks results that match a specified condition to a specified location within the displayed search results and a boost option that changes a ranking by one of: increasing a ranking value and decreasing a ranking value.

18. The system of claim 16, wherein the GUI comprises displaying a match type section, a match value section, and a result action on match section.

19. The system of claim 16, wherein when the match type section is set to a manual condition, the match value section receives a match rule that follows a standard query syntax.

* * * * *